United States Patent
Vande Sande et al.

(10) Patent No.: US 9,470,238 B2
(45) Date of Patent: Oct. 18, 2016

(54) ELECTRIC MOTOR HAVING SEGMENTED STATOR WINDINGS

(75) Inventors: Hans Vande Sande, Mortsel (BE); Cornelis Theodorus Philippi, Wilrijk (BE); Uwe Pahner, Leuven (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 309 days.

(21) Appl. No.: 13/388,577

(22) PCT Filed: Jul. 1, 2010

(86) PCT No.: PCT/BE2010/000049
§ 371 (c)(1),
(2), (4) Date: Feb. 2, 2012

(87) PCT Pub. No.: WO2011/014934
PCT Pub. Date: Feb. 10, 2011

(65) Prior Publication Data
US 2012/0128512 A1  May 24, 2012

Related U.S. Application Data

(60) Provisional application No. 61/230,885, filed on Aug. 3, 2009.

(30) Foreign Application Priority Data

Nov. 24, 2009  (BE) .................................. 2009/0725

(51) Int. Cl.
*F04D 25/06* (2006.01)
*F04D 25/08* (2006.01)
(Continued)

(52) U.S. Cl.
CPC ........... *F04D 25/0646* (2013.01); *F04D 13/06* (2013.01); *F04D 25/0606* (2013.01);
(Continued)

(58) Field of Classification Search
CPC .............. F04D 13/02; F04D 13/0653; F04D 13/0666; F04D 25/0606; F04D 25/06; F04D 25/250646; F04D 29/58; F04D 29/584; F04D 29/5806; F04D 13/06; H02K 1/148; H02K 9/06; H02K 1/20; H02K 1/12; H02K 44/06; H02K 3/00
USPC ...... 417/321, 410.1, 366, 371, 423.1, 423.7, 417/423.9, 423.14, 53; 29/259
See application file for complete search history.

(56) References Cited

U.S. PATENT DOCUMENTS 3,110,827 A   11/1963   Baudry
3,184,624 A    5/1965   Solomon
(Continued)

FOREIGN PATENT DOCUMENTS

CA    1136200 A1   11/1982
CH     397844 A     2/1966
(Continued)

*Primary Examiner* — Bryan Lettman
*Assistant Examiner* — Timothy P Solak
(74) *Attorney, Agent, or Firm* — Bacon & Thomas, PLLC

(57) ABSTRACT

A turbocompressor system including a high speed motor (10) including a rotor (12) mounted in a rotative manner relative to the stator, wherein on the rotor (12) one or more impellers (11) are directly fixed, the stator including active motor structures and a shell (7), including a ferromagnetic stator core (6) and a winding being constructed as toroidally wound coils (5), the shell (7) is constructed in such a manner as to create additional open space between the stator core (6) and the shell (7), constituting a cooling channel (15) through which process gas is passed axially for directly cooling the active motor structures and the rotor (12), prior to compression by the one or more impellers (11).

34 Claims, 12 Drawing Sheets

(51) Int. Cl.
  *F04D 13/06* (2006.01)
  *F04D 29/58* (2006.01)
  *H02K 1/20* (2006.01)
  *H02K 9/06* (2006.01)
  *H02K 3/00* (2006.01)
  *H02K 1/14* (2006.01)

(52) U.S. Cl.
  CPC ........... *F04D25/082* (2013.01); *F04D 29/584* (2013.01); *H02K 1/148* (2013.01); *H02K 1/20* (2013.01); *H02K 3/00* (2013.01); *H02K 9/06* (2013.01); *Y10T 29/49009* (2015.01)

(56) References Cited

U.S. PATENT DOCUMENTS

| | | | |
|---|---|---|---|
| 3,480,810 A | 11/1969 | Potter | |
| 3,567,975 A | 3/1971 | Blesack et al. | |
| 3,932,778 A | 1/1976 | Watanabe et al. | |
| 4,103,197 A | 7/1978 | Ikegami et al. | |
| 4,128,527 A | 12/1978 | Kinjo et al. | |
| 4,211,944 A | 7/1980 | Haller | |
| 4,246,503 A | 1/1981 | Fujioka et al. | |
| 4,255,684 A | 3/1981 | Mischler et al. | |
| 4,306,165 A | 12/1981 | Kitabayashi et al. | |
| 4,492,884 A | 1/1985 | Asano et al. | |
| 4,516,044 A | 5/1985 | Bone | |
| 4,544,855 A | 10/1985 | Prenner et al. | |
| 4,547,713 A | 10/1985 | Langley et al. | |
| 4,563,606 A | 1/1986 | Fukasawa et al. | |
| 4,563,808 A | 1/1986 | Lender | |
| 4,672,252 A | 6/1987 | Spirk | |
| 4,700,092 A | 10/1987 | Bincoletto | |
| 4,818,905 A | 4/1989 | Lender | |
| 5,197,180 A | 3/1993 | Mihalko | |
| 5,304,883 A | 4/1994 | Denk | |
| 5,313,131 A | 5/1994 | Hibino et al. | |
| 5,455,470 A | 10/1995 | Denk et al. | |
| 5,605,045 A | 2/1997 | Halimi et al. | |
| 5,698,925 A * | 12/1997 | Coupart | H02K 5/20 310/216.011 |
| 5,857,348 A | 1/1999 | Conry | |
| 5,986,377 A | 11/1999 | Yamada et al. | |
| 5,998,905 A | 12/1999 | Fougere et al. | |
| 6,009,722 A | 1/2000 | Choi et al. | |
| 6,072,262 A | 6/2000 | Kim | |
| 6,177,751 B1 * | 1/2001 | Suzuki et al. | 310/269 |
| 6,201,321 B1 | 3/2001 | Mosciatti et al. | |
| 6,242,840 B1 | 6/2001 | Denk et al. | |
| 6,296,441 B1 | 10/2001 | Gozdawa | |
| 6,344,703 B1 * | 2/2002 | Sawada et al. | 310/90 |
| 6,445,095 B1 | 9/2002 | Liang et al. | |
| 6,471,493 B2 | 10/2002 | Choi et al. | |
| 6,507,991 B1 | 1/2003 | Ozawa et al. | |
| 6,579,078 B2 | 6/2003 | Hill et al. | |
| 6,583,530 B2 | 6/2003 | Hsu | |
| 6,652,250 B2 * | 11/2003 | Yoshimura | 417/410.4 |
| 6,675,594 B2 | 1/2004 | Choi et al. | |
| 6,685,447 B2 | 2/2004 | Mabe et al. | |
| 6,729,858 B2 * | 5/2004 | Choi | F04D 17/122 417/244 |
| 6,737,784 B2 | 5/2004 | Lindquist et al. | |
| 6,774,519 B2 | 8/2004 | Pullen et al. | |
| 6,781,278 B2 | 8/2004 | Liao | |
| 6,806,612 B2 | 10/2004 | Nakamura et al. | |
| 6,894,418 B2 | 5/2005 | Jones et al. | |
| 6,960,860 B1 | 11/2005 | DeCristofaro et al. | |
| 6,989,620 B2 | 1/2006 | Nilson | |
| 6,994,602 B2 | 2/2006 | Ries | |
| 7,084,544 B2 | 8/2006 | Park et al. | |
| 7,084,545 B2 | 8/2006 | Happel | |
| 7,122,933 B2 | 10/2006 | Horst et al. | |
| 7,145,280 B2 * | 12/2006 | Noble | H02K 1/06 29/596 |
| 7,160,086 B2 | 1/2007 | Maceyka et al. | |
| 7,164,218 B2 * | 1/2007 | Kimura | F04C 23/008 310/216.044 |
| 7,240,515 B2 | 7/2007 | Conry | |
| 7,253,547 B2 * | 8/2007 | Shin et al. | 310/194 |
| 7,269,890 B2 | 9/2007 | Nagano et al. | |
| 7,338,262 B2 | 3/2008 | Gozdawa | |
| 7,367,190 B2 | 5/2008 | Shibui et al. | |
| 7,391,294 B2 | 6/2008 | Howell et al. | |
| 7,923,871 B2 | 4/2011 | Weiss | |
| 2001/0030486 A1 * | 10/2001 | Pijanowski | H02K 1/04 310/254.1 |
| 2003/0038555 A1 | 2/2003 | Ozawa et al. | |
| 2003/0116391 A1 | 6/2003 | Desta et al. | |
| 2005/0093393 A1 * | 5/2005 | Hirzel | H02K 3/12 310/268 |
| 2005/0242670 A1 * | 11/2005 | Lee | 310/43 |
| 2005/0269891 A1 | 12/2005 | Shinoki et al. | |
| 2006/0043820 A1 | 3/2006 | Nakahara et al. | |
| 2007/0018516 A1 | 1/2007 | Pal et al. | |
| 2007/0228847 A1 | 10/2007 | Kim | |
| 2007/0236094 A1 * | 10/2007 | Kaminski | H02K 5/128 310/156.28 |
| 2007/0269323 A1 | 11/2007 | Zhou et al. | |
| 2008/0018192 A1 | 1/2008 | Rocky et al. | |
| 2008/0253907 A1 | 10/2008 | Lind | |

FOREIGN PATENT DOCUMENTS

| | | | |
|---|---|---|---|
| DE | 3629423 A1 | 3/1988 | |
| DE | 102004029442 A1 | 1/2006 | |
| DE | 102005055641 A1 | 5/2007 | |
| EP | 0653112 B1 | 10/1997 | |
| EP | 1017151 A2 | 7/2000 | |
| EP | 1100177 A1 | 5/2001 | |
| EP | 1 324 472 * | 7/2003 | ............. H02K 21/12 |
| EP | 1324472 A2 | 7/2003 | |
| EP | 1074746 B1 | 5/2005 | |
| EP | 1069313 B1 | 9/2005 | |
| EP | 1017153 B1 | 7/2006 | |
| EP | 1482179 B1 | 12/2006 | |
| EP | 0964498 B1 | 1/2007 | |
| EP | 1680855 B1 | 3/2007 | |
| EP | 1322022 B1 | 5/2007 | |
| EP | 1901415 A1 | 3/2008 | |
| EP | 1392981 B1 | 7/2008 | |
| EP | 1251624 B1 | 1/2009 | |
| EP | 2072824 A2 | 6/2009 | |
| EP | 2113671 A1 | 11/2009 | |
| EP | 2295811 A1 | 3/2011 | |
| GB | 772973 A | 4/1957 | |
| GB | 1395742 A | 5/1975 | |
| GB | 2429849 B | 3/2007 | |
| GB | 2436268 B | 9/2007 | |
| GB | 2454188 A | 5/2009 | |
| JP | 54041401 A | 4/1979 | |
| JP | 08154350 A | 6/1996 | |
| JP | 2001333555 A | 11/2001 | |
| JP | 2002272049 A | 9/2002 | |
| JP | 2002325404 A | 11/2002 | |
| JP | 2002345217 A | 11/2002 | |
| JP | 2003102135 A | 4/2003 | |
| JP | 2005110454 A | 4/2005 | |
| JP | 2006288187 A | 10/2006 | |
| JP | 2007014140 A | 1/2007 | |
| JP | 2007135392 A | 5/2007 | |
| JP | 2007336751 A | 12/2007 | |
| JP | 2008048490 A | 2/2008 | |
| KR | 20010064011 A | 7/2001 | |
| KR | 1020040065520 A | 7/2004 | |
| KR | 1020040065521 A | 7/2004 | |
| KR | 1020040065529 A | 7/2004 | |
| KR | 1020040065531 A | 7/2004 | |
| KR | 100661702 B1 | 12/2006 | |
| KR | 10-2007-0092817 A | 9/2007 | |
| KR | 100804810 B1 | 2/2008 | |
| RU | 2120172 C1 | 10/1998 | |
| RU | 2206168 C2 | 6/2003 | |
| WO | 9101585 A1 | 2/1991 | |
| WO | 9508861 A1 | 3/1995 | |

(56) References Cited

FOREIGN PATENT DOCUMENTS

| WO | 9901924 A1 | 4/1999 |
| WO | 0007286 A1 | 2/2000 |
| WO | 0017524 A1 | 3/2000 |
| WO | 0049296 A1 | 8/2000 |
| WO | 0105015 A2 | 1/2001 |
| WO | 0134850 A2 | 5/2001 |
| WO | 0215229 A1 | 2/2002 |
| WO | 0250481 A1 | 6/2002 |
| WO | 2004057628 A2 | 7/2004 |
| WO | 2004098025 A1 | 11/2004 |
| WO | 2007110281 A1 | 10/2007 |
| WO | 2008085466 A1 | 7/2008 |
| WO | 2008138379 A1 | 11/2008 |
| WO | 2009/115389 A1 | 9/2009 |
| WO | 2010/018171 A1 | 2/2010 |

\* cited by examiner

ELECTRIC MOTOR HAVING SEGMENTED STATOR WINDINGS

FIELD OF INVENTION

The invention relates to a turbocompressor system comprising a high speed motor and to a method for constructing turbocompressor system.

BACKGROUND OF THE INVENTION

In a turbocompressor, one or more impellers are directly connected to a shaft. For their operation, the impellers must be driven at very high rotational speeds, e.g. 20000 rpm up to 100000 rpm and even more. Traditionally, these elevated speeds were attained by combining a standard induction motor and a gearbox, the latter consisting of a large bull gear and at least one small pinion gear. The losses in this gearbox can be considerable, negatively influencing the system efficiency. Moreover, such a gearbox is heavy and it constitutes a major part of the footprint of the entire system.

Meanwhile, advances in high speed motor technology have enabled the development of direct driven turbocompressors. By increasing the motor speed, less torque is required for the same output power. However, since the motor volume is known to vary approximately proportional to the torque, this also implies a higher power and loss density. Consequently, the operational limits of high speed motors and direct driven turbocompressors are strongly determined by the performance of the cooling system and by the extent to which losses, are kept under control.

Many techniques for cooling electrodynamic machines have been published before. Obviously, these ideas have been adopted in the field of direct driven turbomachines. Below, a summary of these methods is given, for radial flux machines with an inner rotor.

Providing cooling fins at the exterior of a machine is standard. Their operation can be enhanced by some way of forced convection using an independent fan or even, in case of a compressor, by ducting the process gas partially or entirely over these fins. In the scope of direct driven turbocompressors, this is found e.g. in U.S. Pat. No. 6,675,594 B2, KR 10/0572849 B1 and KR 10/0661702 B1.

The use of cooling channels or shells in a housing surrounding the stator, through which a fluid—most frequently a liquid—is flowing, is common. If properly designed, copper and iron losses generated in the stator can be efficiently evacuated in this way. Though apparently simple, there are some constructional issues that require particular attention. For example, the cooling channels are often to be sealed properly from the rest of the system. In systems where the cooling fluid is directly in contact with the stator outer circumference, leakage towards the inside of the stator is undesired. If the latter is prevented by a thin supplementary shell in between the stator lams and the cooling channels, an additional thermal contact resistance is introduced. This type of cooling is encountered in many patents dealing with direct driven turbomachines, as e.g. in U.S. Pat. No. 5,605,045 A, U.S. Pat. No. 5,857,348 A, U.S. Pat. No. 6,296,441 B1, U.S. Pat. No. 6,579,078 B2, U.S. Pat. No. 6,675,594 B2, U.S. Pat. No. 6,685,447 B2, U.S. Pat. No. 7,160,086 B2, U.S. Pat. No. 7,240,515 B2, US 2007/269323 A1, U.S. Pat. No. 7,338,262 B2, U.S. Pat. No. 7,367,190 B2, KR 10/0572849 B1, WO 00/17524 A1, WO 00/49296 A1 and WO 2008/138379 A1. However, plenty of prior art on this cooling technique is found in patents only dealing with motor or generator cooling as such: e.g. in U.S. Pat. No. 3,184,624 A, U.S. Pat. No. 3,480,810 A, U.S. Pat. No. 3,567,975 A, U.S. Pat. No. 4,516,044 A, U.S. Pat. No. 4,700,092 A. In US 2003/038555 A1 and U.S. Pat. No. 6,507,991 B1, this concept is applied to a slotless motor design, where the cooling channels are formed by radial outward fins integrated in the core.

Exterior cooling channels or shells are not always sufficient to get a system thermally under control. Sometimes, the stator and/or the coils are therefore equipped with internal axially oriented cooling channels. These may be completely sealed from their surrounding, allowing e.g. cooling with special agents. They may as well be open, thereby enabling a fluid to cool other structures such as the endturns as well. In the field of turbomachines, this is seen e.g. in U.S. Pat. No. 6,471,493 B2, US 2008/253907 A1, WO 00/49296 A1, WO 2007/110281 A1 and EP 1680855 B1.

The previous methods mainly focus on evacuating heat generated inside the stator core and the coils. Heat produced in more deeply lying system elements, such as the rotor and the gap (windage loss), is hardly evacuated. Therefore, one frequently encounters methods in which a gas—often air—is forced to flow in some way through the gap between the stator and the rotor. Several gas flow configurations can be distinguished: gas entering the gap at one axial end and leaving the gap at the opposite axial end, gas entering/leaving the gap at both axial ends and leaving/entering the gap radially through the coils and/or the stator thereby cooling these structures as well. In the field of direct driven turbomachines, this cooling method is encountered in e.g. U.S. Pat. No. 6,579,078 B2, U.S. Pat. No. 6,994,602 B2, U.S. Pat. No. 7,160,086 B2, WO 95/08861 A1, WO 2007/110281 A1 and WO 2008/138379 A1. Pal et al., cfr. US 2007/018516 A1, additionally apply a sort of labyrinth structure in between the rotor and the stator to enhance cooling. The idea of cooling a motor by a forced gas flow through the gap between the stator and the rotor is found as prior art in earlier patents dealing with motor cooling alone, as e.g. in U.S. Pat. No. 3,110,827 A, U.S. Pat. No. 4,544,855 A or GB 772973 A.

The required pressure for driving gas through the gap and/or its surrounding structure, may originate from a separate fan, from a small blower directly attached to or integrated in the shaft, or even from a tap after the first compression stage, in case of a compressor. Kim et al., cfr. KR 2001/0064011 A, have integrated a sort of blower inside the active part of the motor, using a thin helical groove at the stator inner surface or the rotor outer surface. The axial pressure drop is influenced by tangential acceleration of the gas while entering the gap. It is of particular concern in high speed motors, where the tip speed of the rotor may be extremely high. In such cases, relatively large powers may be required to achieve this type of forced convection, thereby reducing the efficiency of the whole system. This negative impact can be reduced by increasing the gap or by leaving some free space on top of the slots. Obviously, both suggestions affect the electro-magnetic design as well.

If necessary for the application, the inside of the rotor can also be cooled by a forced flow of some fluid or liquid through a particular configuration of axial and/or radial holes, as seen e.g. in U.S. Pat. No. 5,605,045 A, U.S. Pat. No. 6,296,441 B1, U.S. Pat. No. 6,685,447 B2 and GB 2454188 A.

In addition to the iron, copper and windage losses inside the machine, a large part of the copper loss is generated in the endturns. These can be cooled by forced convection as well. This may be done independently or in combination with one of the previous methods. Explicit examples of this method related to turbomachines are found in e.g. U.S. Pat. No. 6,009,722 A, U.S. Pat. No. 6,471,493 B2, U.S. Pat. No. 6,675,594 B2, U.S. Pat. No. 7,160,086 B2, US 2008/253907 A1, WO 00/49296 A1, KR 2001/0064011 A, KR 10/0661702 B1 and WO 2008/138379 A1. Prior art is e.g. found in U.S. Pat. No. 3,932,778 A, U.S. Pat. No. 4,246,503 A, U.S. Pat. No. 4,306,165 A and CH 397844 A.

Another method for cooling the endturns is pouring them into an electrically insulating yet thermally conductive material, in order to realize a thermal bridge towards another thermally conductive material, often the machine's housing. Prior art is e.g. found in U.S. Pat. No. 4,128,527 A, U.S. Pat. No. 4,492,884 A, U.S. Pat. No. 6,201,321 B1 and U.S. Pat. No. 6,445,095 B1.

Thus far, only techniques for evacuating losses have been discussed. However, designers should first try to keep the losses of the entire system as small as possible. This is especially true for high speed motors, for their high power and loss density. Below, some alternative choices are discussed.

One may e.g. choose between different motor types. Electronically commutated (EC) machines excited with permanent magnets, such as permanent magnet synchronous machines (PMSM) and brushless DC machines (BLDC), rotate at the same speed as that of the applied magnetic field. The generated rotor losses are basically due to stator slotting and/or current harmonics. Their value is relatively small and their presence is not fundamental for correct operation of the machine. In an induction machine, additional losses are generated by the currents induced in the rotor due to the slip. Also, the efficiency of induction motors is more sensitive to speed variations, making them less attractive in applications where the speed is to be controlled over a relatively large range.

In a high-speed context, characterized by relatively low torques, the slip of an induction machine can be very small, and other properties may determine the choice of motor type. E.g. Induction machines are known for their relatively low cost and ease of operation, whereas PMSM machines with surface mounted magnets contained within a sleeve are fairly complicated and thus more costly. On the other hand, when aiming high speed operation, rotordynamic considerations generally urge the use of solid rotors even in case of induction machines, requiring other design approaches for these machines.

Other motor types such as switched reluctance motors and traditional DC motors are less suitable for high-power high-speed applications and are therefore not considered in the discussion.

Complementary to distinguishing between motor types based on their operation principles, one can choose between motors based on their stator construction. The majority of radial flux motors with an inner rotor have a slotted stator. Coils can thereby be concentrated around a single tooth or distributed over the stator. Concentrated windings are much easier to insert than distributed windings, but their resulting spatial distribution of the magneto-motive force causes more harmonic losses and cogging in the machine. This makes concentrated windings less suitable for high-speed applications.

However, even when equipped with a distributed winding, a slotted design induces more losses in the rotor than a slotless design does, for the latter has a much larger magnetic gap between stator and rotor. Slotless machines also exhibit less cogging for the same reasons. This makes slotless machines attractive for high-speed applications, particularly when combined with a permanent magnet rotor. A thorough investigation of slotless permanent magnet high speed motors is found in the PhD thesis of Jörgen Engström, "Analysis and Verification of a Slotless Permanent Magnet Motor for High Speed Applications".

Another way for controlling the loss in a motor is choosing between different core materials. If laminated steels are used, one can minimize the eddy current loss by maximally reducing the thickness of the lams, even though this may significantly increase the material cost. Next to thickness, the grade selection plays a crucial role in loss minimization. Both, non-oriented and oriented low-loss grades are found in motors. The non-oriented grades are most common for their isotropic properties. However, the anisotropic magnetic nature of oriented steels should be exploited whenever possible. First, standard available grain-oriented steels have significantly lower specific energy losses than standard available non-oriented steels (e.g. $0.73 \rightarrow 1.11$ W/kg compared to $2.1 \rightarrow > 8$ W/kg, all values at 1.5 T peak and 50 Hz). Second, standard available grain-oriented steels are thinner than standard available non-oriented steels (e.g. $0.23 \rightarrow 0.35$ mm compared to $0.35 \rightarrow 0.65$ mm). Consequently, given a cost, frequency and flux density level, the use of grain-oriented steel favorably influences the machine's efficiency. A thorough discussion of electrical steel properties is given in the book "Electrical Steels for Rotating Machines", by Philip Beckley.

One could use soft magnetic composite (SMC) powders as well. These are attractive for high speed applications, for their comparatively low eddy current loss at elevated frequencies. They can also be advantageously used in unconventional motor configurations, for their 3D isotropic magnetic and thermal properties. On the other hand, their permeability and saturation flux density is smaller than that of traditional motor steels, and small series production with SMC is not likely to be cost-effective. Thorough descriptions of the applicability of SMCs in electrical motors is e.g. found in the publications "Soft magnetic composites offer new PM opportunities" by Persson et al, "Comparative Study of. High-Speed PM Motors with Laminated Steel and Soft Magnetic Composite Cores" by Yunkai Huang et al. and "Experience with ATOMET Soft Magnetic Composites Properties, Pressing Conditions and Applications" by Viarouge et al., amongst many others.

One could also consider using amorphous or even nanocrystalline ribbons. However, since these are very thin and hard, fabrication tools and dies wear more rapidly, increasing the cost of such stators. Moreover, these materials are brittle and feature significant magnetostriction. Hence, magnetic stators built with this type of material, are subject to large stresses varying at multiples of the rotational frequency, most likely limiting their lifetime. Particular measures should therefore be taken when used in motors. Nevertheless, some applications have e.g. been found in U.S. Pat. No. 4,255,684 A, U.S. Pat. No. 6,737,784 B2 and U.S. Pat. No. 6,960,860 B1.

In order to further reduce the motor loss, one may take some measures outside the motor as well. One common example is a sine filter. This device filters the higher harmonics in the motor current, which would otherwise cause non-synchronous rotating fields and hence extra losses in the machine.

Another exterior example is the power electronic drive, basically consisting of a set of semiconductors that are continuously switching between on and off, according to some particular control scheme. The smaller the switching frequency is, the larger the harmonic content of the output current is, and the higher the motor losses are. Obviously, the particular switching pattern itself (e.g. sinusoidal PWM, space vector modulation, etc. . . . ) affects the losses as well, in addition to the number of phases and/or poles of the motor.

From the previous non-exhaustive description, it follows that a sound thermal management of a high speed motor can only be the result of a well-considered combination of several of the mentioned measures. Actually, the designer of a high speed motor should make his decisions on a higher level than that of the motor alone. In case of a compressor unit, one of the major points of interests is the total system efficiency. In that respect, it is not sufficient to get the losses in some parts below a certain value. It should also be done efficiently, at an acceptable cost and in view of the entire system.

For example, large switching frequencies in the semiconductors might be attractive for the motor, but they reduce the efficiency of the drive. Hence, some trade-off must be found. In the particular case of high speed motors, this may become a difficult exercise, since the base frequency of the machine may be so high as to require elevated switching frequencies anyhow for still getting some acceptable output current harmonics level.

In another example, cooling gas might be conducted through the gap and/or some ducts in the machine. Whether the required pressure is obtained via a separate fan, via a small blower directly attached to or integrated in the shaft or from a tap after the first compression stage, this involves some power consumption and hence influences the overall system efficiency.

In some applications, the process gas is entirely guided over a series of fins or through a sort of cooling shell around the stator before being compressed. Doing so avoids additional equipment but also entails some efficiency loss on the system level, because the entailed pressure loss must be compensated by a higher pressure ratio in the stage(s) and because the gas is already heated prior to compression. Nevertheless, it is found e.g. in U.S. Pat. No. 6,009,722 A, U.S. Pat. No. 6,675,594 B2, U.S. Pat. No. 6,774,519 B2, WO 00/49296 A1, WO 02/50481 A1, KR 10/0572849 B1, KR 10/0661702 B1.

This invention relates to radial flux slotless motors for turbocompressors. Therefore, an overview of state-of-the-art radial flux slotless motor technology is given.

Radial slotless motors can be distinguished by their particular coil and core construction. Often, the coil concept is rather traditional, in the sense that the iron core entirely surrounds the copper conductors. Among this class, one can make a further distinction between coils approximating a homogeneous fill of the space between the rotor and the stator iron, and coils that do not have this property. However, many slotless designs are encountered in which a coil is toroidally wound around the core. In such cases, copper is being found at both radial sides of the core. In this class, one could distinguish between designs having a stator core constructed as a single piece or designs have a stator core consisting of a series of segments.

Examples of radial slotless motors having an iron core entirely surrounding a homogeneously distributed set of conductors are found e.g. in patents U.S. Pat. No. 4,211,944 A, U.S. Pat. No. 5,197,180 A, U.S. Pat. No. 5,313,131 A, U.S. Pat. No. 5,998,905 A, U.S. Pat. No. 6,072,262 A, U.S. Pat. No. 6,507,991 B1, US 2003/038555 A1, U.S. Pat. No. 6,806,612 B2, U.S. Pat. No. 7,269,890 B2, US 2007/269323 A1, WO 02/15229 A1, WO 2004/098025 A1, WO 2008/085466 A1, EP 0653112 B1, CA 1136200 A1, JP 8154350 A, JP 2002/325404 A, JP 2002/345217 A, JP 2005/110454 A and JP 2006/288187 A. For further reference, it is indicated that the slotless motor concept shown in US 2003/038555 A1 and U.S. Pat. No. 6,507,991 B1 also belongs to this class, but has a segmented core consisting of two arc-shaped parts as well.

Examples of radial slotless motors having an iron core entirely surrounding a non-homogenously distributed set of conductors are found e.g. in patent documents U.S. Pat. No. 4,563,808 A, U.S. Pat. No. 4,818,905 A, U.S. Pat. No. 6,894,418 B2, U.S. Pat. No. 7,084,544 B2, WO 91/01585 A1, WO 00/07286 A1, EP 1680855 B1, GB 2429849 B, JP 2001/333555 A, JP 2002/272049 A, JP 2003/102135 A, JP 2005/110456 A, JP 2007/014140 A, JP 2007/135392 A, JP 2007/336751 A, RU 2120172 C1 and RU 2206168 C2. The differences between all these concepts are generally related to the construction of both the coils and the core, and the materials that are used for the core.

Examples of radial slotless motors having a toroidal coil wound around a stator core constructed as a single piece are found e.g. in U.S. Pat. No. 4,103,197 A, U.S. Pat. No. 4,547,713 A, U.S. Pat. No. 4,563,606 A, U.S. Pat. No. 5,304,883 A, U.S. Pat. No. 5,455,470 A, U.S. Pat. No. 6,242,840 B1, U.S. Pat. No. 6,344,703 B1, U.S. Pat. No. 6,989,620 B2, U.S. Pat. No. 7,145,280 B2, US 2008/018192 A1, U.S. Pat. No. 7,391,294 B2, WO 00/49296 A1, WO 2004/057628 A2, EP 1017151 A2, EP 0964498 B1, EP 1017153 B1, EP 1100177 A1, DE 3629423 A1, GB 2436268 B, JP 2008/048490 A, KR 2004/0065520 A and KR 10/0804810 B1. They are all characterized by an annular shape of the final core. They basically differ by the way the coils and the core are constructed.

Examples of radial slotless motors having a toroidal coil wound around a stator core constructed as a series of segments have only been found in a few patents. Zhang, EP 1324472 A2, proposes an annular shaped core consisting of three arc-shaped segments. Choi, KR 2004/0065521 A, KR 2004/0065529 A and KR 2004/0065531 A, proposes a hexagonally shaped core of six linear segments. The latter is particularly attractive for constructional purposes, but it introduces a non-uniform gap and thus causes some cogging.

The idea of constructing a stator core out of segments is not new, particularly not in the field of very large motors or generators. Though, it can have some attractive advantages for smaller machines as well. For example, the rotor of high speed machines is often made out of a solid steel base. In such cases, the inner part of a punched lamination is to be scrapped. Using a segmented core yields significant material savings. Sometimes, segmentation is done for explicitly allowing the use of grain-oriented steels for its attractive properties as described earlier (U.S. Pat. No. 4,672,252 A, US 2006/043820 A1). In addition to the latter, further material savings can even be obtained when separately punching teeth and/or core segments (GB 1395742 A, US 2001/030486 A1, WO 01/05015 A2, WO 99/01924 A1, WO 01/34850 A2, DE 102004029442 A1). Segmentation may also be used to ease the insertion of coils and/or the entire manufacturing process (U.S. Pat. No. 5,986,377 A, U.S. Pat. No. 6,507,991 B1, U.S. Pat. No. 6,583,530 B2, U.S. Pat. No. 6,781,278 B2, U.S. Pat. No. 7,084,545 B2, U.S. Pat. No. 7,122,933 B2, US 2003/038555 A1, US 2005/269891 A1, EP 1322022 B1, EP 1901415 A1, GB 2394123 B, DE 102005055641 A1, JP 54041401 A, KR 2004/0065521 A).

SUMMARY OF THE INVENTION

The present invention relates to a turbocompressor system comprising a high speed motor having a number of phases larger than one. The motor comprises a stator and a rotor mounted in a rotative manner relative to the stator. On the rotor one or more impellers are directly fixed. The stator comprises active motor structures and a shell. The active motor structures comprise a ferromagnetic stator core and a winding. The winding is constructed as a series of toroidally wound coils such that the coils are physically separated as to form an open space. The shell is constructed in such a manner as to create additional open space between the stator core and the shell. The open space constitutes a cooling channel confined at the inside by the rotor and the stator core and confined at the outside by the stator core and the shell. The cooling channel serves as a duct through which process gas is passed axially for directly cooling the active motor structures and the rotor prior to compression by one or more impellers.

By constructing a turbocompressor system in this way, a strongly integrated system is obtained. Such a system has several characteristic properties and corresponding advantages.

The process gas itself is used for cooling the high speed motor prior to compression. This causes some heating of the process gas and some additional pressure drop. However, the extra power this entails for compressing the gas afterwards can be recovered on the higher system level, since no auxiliary equipment is needed for realizing other cooling mechanisms. The art is to design the system in such a way that both, the pressure drop and the temperature rise prior to compression are minimized.

The stator is designed with a toroidally wound core, thereby providing a maximally open structure by which cooling gas can get at the same time in narrow contact with both the ferromagnetic core and the coils.

The stator core is preferably built-up as a series of segments to minimize waste of material and to ease assembly. Neighboring segments can even be equipped with a coil before being fixed to each other.

The stator core segments are preferably stacked with thin low-loss grain-oriented steel, for this reduces the magnetic losses to a maximum extent at an acceptable cost level.

The stator core segments are preferably stacked with single piece laminations having outward extensions, for this enhances cooling of the stator core, for this avoids the fixation of separate extensions to the stator core afterwards, and for this increases the leakage inductance of the coils thereby reducing the losses due to current harmonics.

The shell is preferably constructed by winding a flexible material around the outward extensions with some prestress, for this applies radial force on the outward extensions to automatically retain the stator core, for the resulting polygonally shaped shell prevents any tangential movement of the stator core relative to the shell, for this process is simple and cost-effective, and for this construction avoids the need for a complicated and likely expensive solid shell.

The motor is of a slotless type, by which the losses due to slot harmonics are virtually eliminated and the losses due to current harmonics and magneto motive force harmonics are drastically reduced.

BRIEF DESCRIPTION OF THE DRAWINGS

With the intention of better showing the characteristics of the invention, hereafter, by way of example without being limitative in any way, a description is given of some preferred embodiments of a turbocompressor system according to the invention, reference being made to the accompanying drawings, wherein.

DETAILED DESCRIPTION OF VARIOUS EMBODIMENTS OF THE INVENTION

Figure 1:
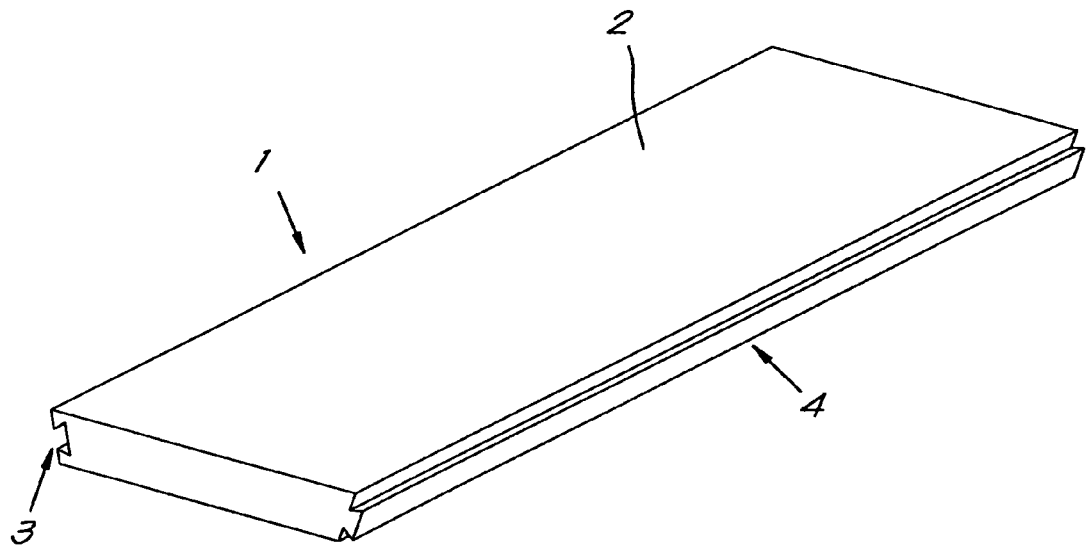
FIG. 1 represents a straight core segment of the stator core.

The stator core of a high speed motor according to the present invention is preferably built-up of a plurality of soft-magnetic core segments 1 comprising a plate shaped segment base 2. The segment base 2 may be straight, as shown in FIG. 1.

Preferably, said core segment 1 is further provided with connecting means, in this case in the shape of recesses and protrusions, for interconnecting said core segments 1. According to a preferred characteristic of the invention, the above-mentioned recesses and protrusions are realized in the shape of a dovetail like structure provided along the longitudinal side edges of said segment base 2, more particulary, a dovetail shaped groove 3 on one side edge of the segment base 2 and a dovetail shaped rib 4 on the opposite side edge of said segment base 2.

Figure 2:
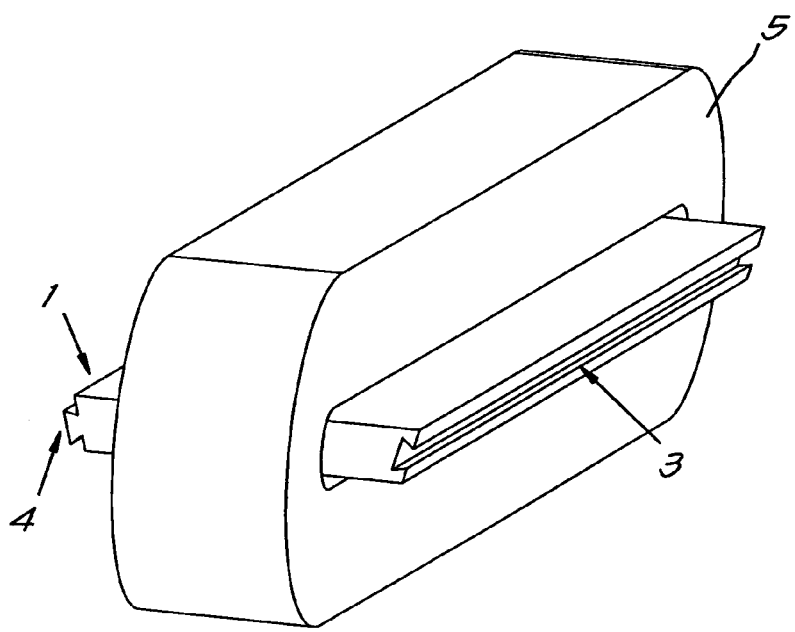
FIG. 2 represents a straight core segment of the stator core with a coil mounted on it.

Before being connected, a coil 5 is mounted on each individual segment 1, as is illustrated in FIG. 2. There are at least two ways of mounting such a coil 5. In a first process, one may manually and/or automatically wind a coil 5 on a rectangular bobbin beforehand, slide the entire assembly over the core segment 1, and attach both to each other. In a second process, one may manually and/or automatically wind a flexible insulation around the core segment 1, followed by a direct winding process of the conductors on top of this insulation. In both cases, the risk of damaging the conductor insulation is significantly reduced when compared to that of manual insertion of conductors in a toothed stator. Moreover, one could easily consider the use of Litz-wires here. Litz wires are designed for use in higher-frequency applications and are thus the better choice in high-speed motors.

Figure 3:
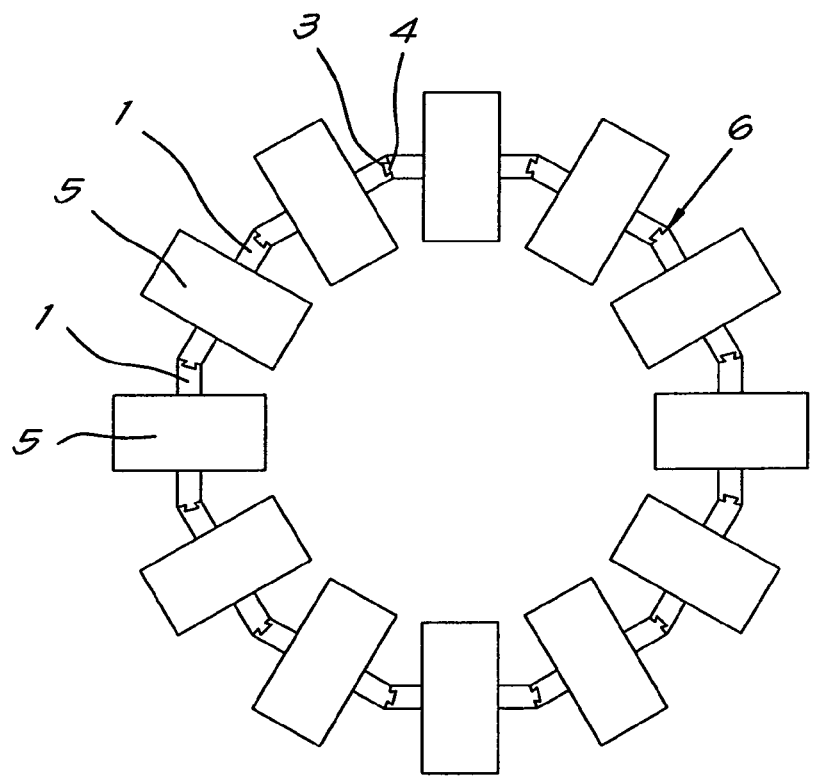
FIG. 3 represents a polygonal stator core consisting of twelve straight core segments according to FIG. 1.

Once all core segments 1 are connected, a toroidally wound soft magnetic stator core 6 is obtained. In this case the cross section of the stator core 6 has a polygonal shape, as shown in FIG. 3. The total number of core segments 1 depends on a few principal factors. First, the number of core segments 1 is an integer or fractional multiple of the number of phases. Second, in the particular case of a polygonal stator core 6, the number of core segments 1 depends on the maximally allowed cogging torque caused by the magnetic non-uniformity of the gap between the stator core 6 and the rotor: the bigger, the better. Third, in case two conductor layers are wound around each core segment 1 in order to realize a double-layer type winding, the number of core segments 1 depends on the distribution of the magneto-motive force along the circumference of the stator core 6: the more, the better. Fourth, it depends on the manufacturing cost: the less, the better. A trade-off between these parameters is to be found.

In order to minimize the losses in the stator core 6, the soft-magnetic core segments 1 are preferably constructed as a laminated stack of grain-oriented steel laminations. The individual laminations are stacked in axial direction. The majority of the magnetic field lines are following the contours of the cross section of the stator core 6. Therefore, if straight core segments 1 are used, the preferred magnetization axis of said grain-oriented steel laminations should preferably coincide with the tangential centre-line of said core segments 1.

Figure 4:
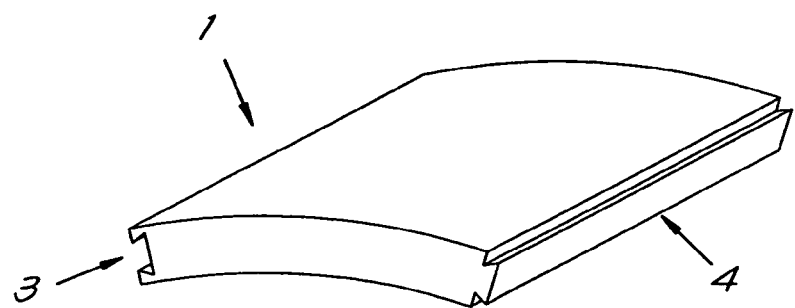
FIGS. 4 to 6 represent a variant according to FIGS. 1 to 3 with arc-shaped core segments of the stator core.

FIG. 4 shows a variant of a core segment 1 according to FIG. 1, in which the segment base 2 is made arc-shaped and which, in this case, also comprises recesses and a protrusions in the shape of a dovetail connection.

Figure 5:
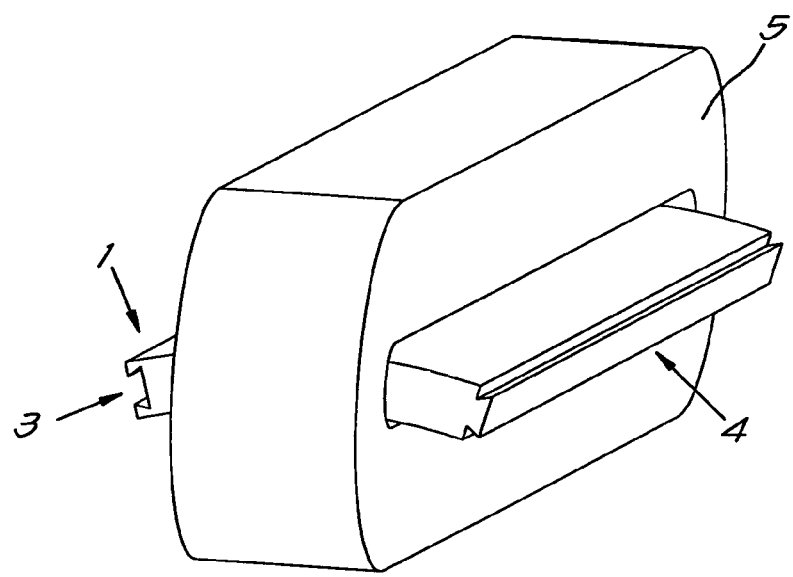
Figure 6:
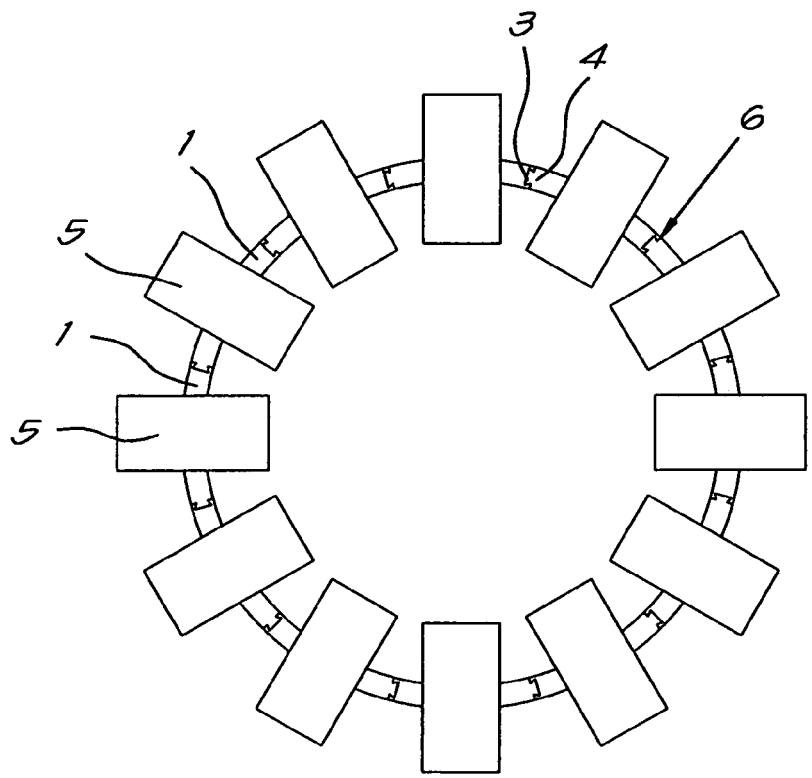

FIG. 5 shows the arc-shaped core segment 1 of FIG. 4 whereby a coil 5 is mounted thereupon, while FIG. 6 shows a stator core 6 comprising several interconnected arc-shaped core segments 1 of FIG. 4, whereby the cross section of said stator core 6 has a hollow cylindrical shape.

In order to minimize the losses in the stator core 6 in the particular case that said arc-shaped segments are stacked using said grain-oriented steel laminations, the preferred magnetization axis of said grain-oriented steel laminations should coincide with the line perpendicular to the bisector of the angle defined by the tangential edges of said core segment 1.

For core segments 1 having other shapes than a straight shape or an arc shape as described above, as will be discussed further, the most optimal magnetically preferred orientation of said steel laminations is to be defined by a thorough numerical analysis. Whatever the case, the aim is to minimize the reluctance of the stator core 6 for field lines following the contour of that stator core 6. Obviously, the core segments 1 may be made of non-oriented soft-magnetic steels, amorphous or nanocrystalline soft magnetic ribbons, soft-magnetic powder composites and/or other soft-magnetic materials as well.

In another embodiment of the invention, the stator core 6 can be constructed by stacking a series of polygonally or tubularly shaped single-piece laminations. This enhances the stiffness of the core. However, it complicates the winding process, it yields large material waste while punching or cutting the laminations since the central parts of the steel laminations are not used, and it requires the use of non-oriented steel having less attractive properties than oriented steel.

Figure 7:
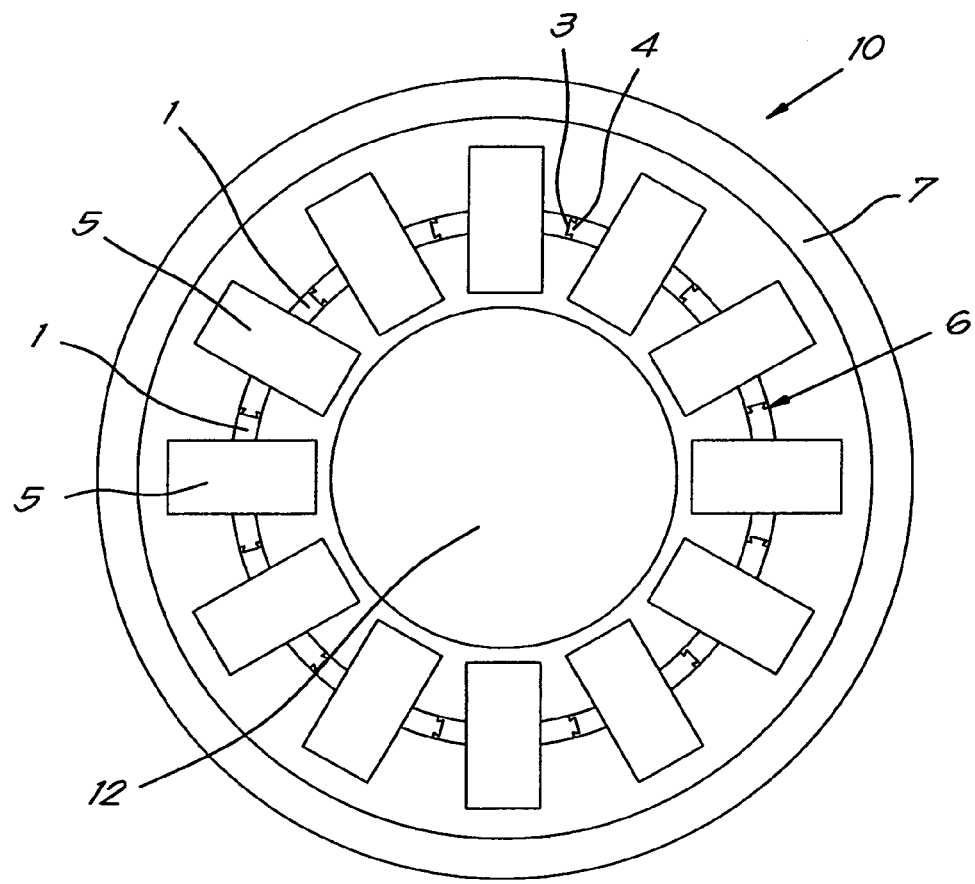
FIG. 7 shows a cross section of a slotless motor according to the invention, with a rotor and outer shell.

One key idea of the present invention is to enclose the active parts of the stator in some way by a shell 7, as shown in FIG. 7 which represents a motor 10 with a central rotor 12 and a surrounding stator, which stator comprises said shell 7 and active motor structures which are formed by said stator core 6 and one or more windings composed of interconnected coils 5.

The shell 7 may be constructed as a plurality of segments, but this is not strictly required. The shell 7 may be made of a soft-magnetic material. In that case, it increases the leakage inductance of the windings and it reduces the harmonic content of the currents, as described by Nilson in U.S. Pat. No. 6,989,620 B2. It also creates a low-resistant thermal path. On the other hand, iron losses are generated in such a shell 7. This can be partially remedied by stacking the shell 7 using laminations or winding the shell 7 using soft-magnetic wires. The shell 7 may also be constructed using non-magnetic but conductive materials, such as aluminum, thereby creating a low-resistance thermal bridge as well. The shell 7 may also be made out of a non-conductive material such as a strong plastic or glass fiber. Constructional arguments for the shell 7 are given further.

Referring to FIG. 7, when viewed from an axial side, there is plenty of tangential space between subsequent coils 5, particularly close to the shell 7. The radial space between the coils 5 and the shell 7 can be chosen by the designer. The resulting space is primarily intended for axially ducting the process gas, in order to cool down the active stator parts, prior to compression. Therefore, there is always an axial pressure drop, which must be accounted for during the design of the compression stages and which has some negative impact on the power required for compression. However, the magnitude of the pressure drop can be influenced by modifying the inner diameter of the shell 7. When properly designed, this pressure drop can be made very small when compared to the desired pressure ratio of the whole system.

Figure 8:
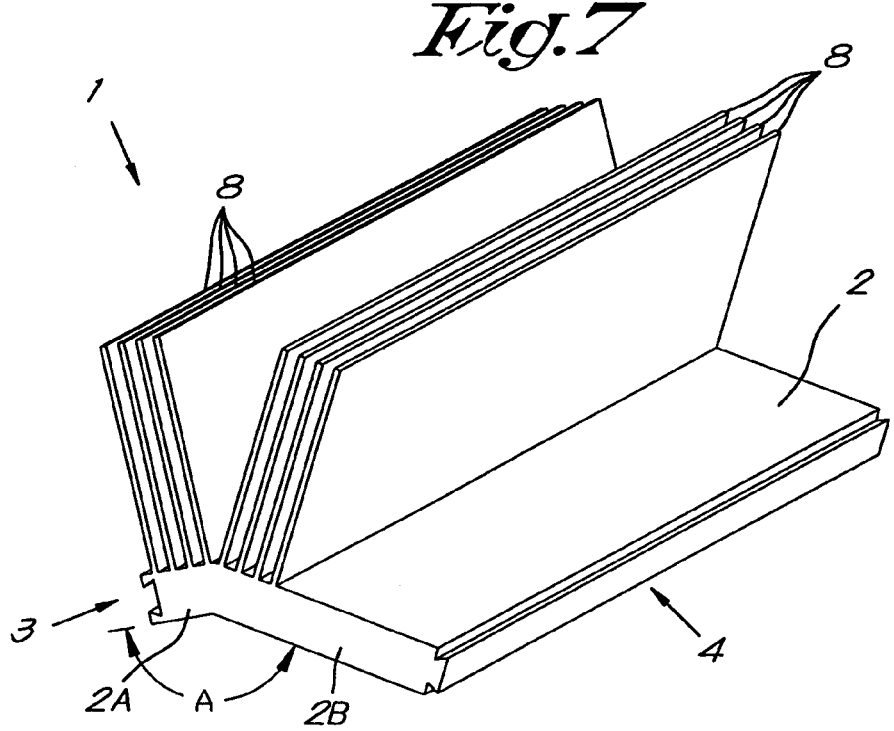
FIG. 8 shows a core segment of a stator core with radially outward extensions at one side.

The majority of the losses generated in the stator core 6 shown in FIG. 7 are evacuated by forced convection over the free surfaces of the stator core 6. Losses generated in the centre, underneath the coils 5, must first flow tangentially by conduction, before being evacuated radially by convection. In order to increase the convective surface, and thus to achieve a higher cooling capacity, radially outward extensions 8 can e.g. be provided near one edge on the core segments 1, as shown in FIG. 8.

In this case said core segments 1 comprise a basically flat segment base 2 with a bent down portion near one side edge of said segment base 2 so as to obtain an asymmetrical V-shaped cross-section with two legs 2A and 2B, as said bent down portion of the base constitutes a first leg 2A and the remaining part of the base 2 forms the other leg 2B which, in this case, is considerably larger in length than said leg 2A. The angle A enclosed by said legs 2A and 2B is rather large and amounts approximately up to a value situated in the range from 95 to 175 degrees, and preferably of approximately 155 degrees, depending on the number of core segments 1 to be used.

As discussed above, the outwardly directed extensions 8 (e.g. fins) are provided near one edge on the core segment 1, and in this case near the bend in the segment base 2, whereby in this example four extensions 8 extend perpendicularly onto the first leg 2A, while four other extensions 8 extend perpendicularly on said second leg 2B, such that said extensions 8 on the respective legs 2A and 2B, show an approximate V-shape.

Figure 9:
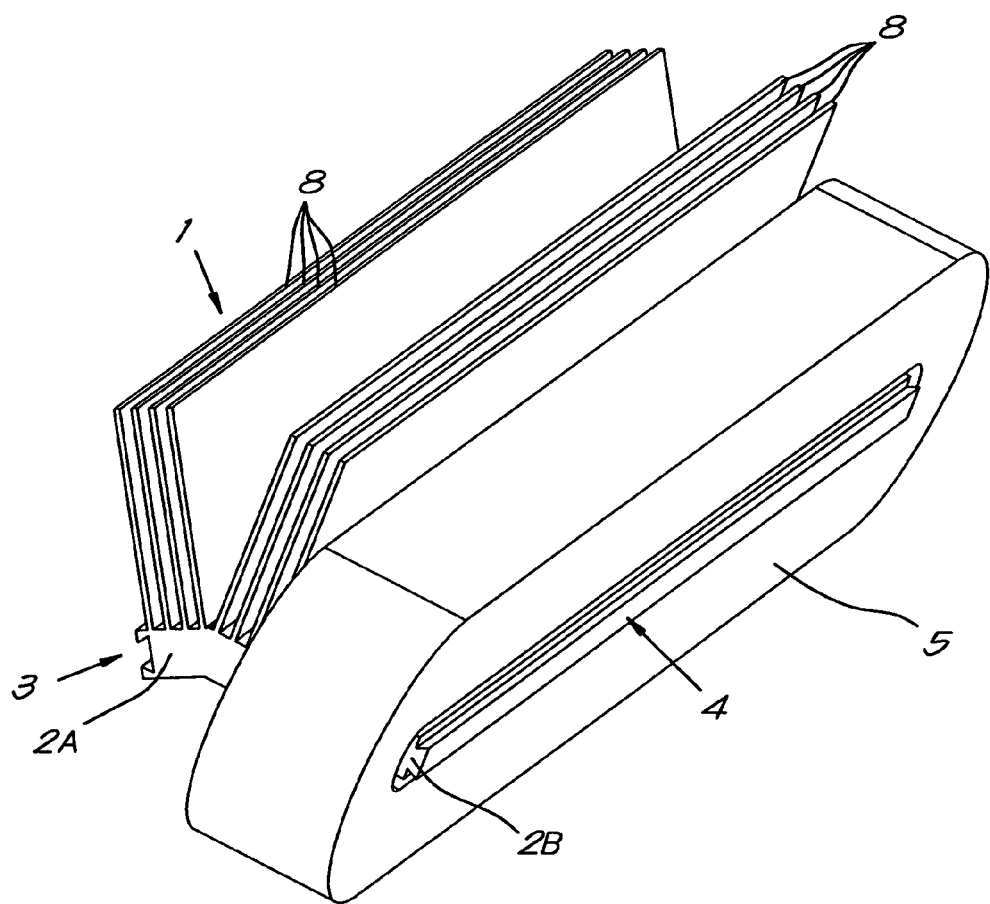
FIG. 9 shows a segment of a stator core with radially outward extensions at one side and a coil mounted on it via the other side.

As the extensions on the second leg 2B are only provided near the bend of the segment base 2, while, at the free edge of this leg 2B, this leg 2B remains free of extensions, a bobbin can be slid over the core segment 1 via this free end, as shown in FIG. 9. If grain-oriented steel is used for this type of core segment 1, the magnetically preferred orientation of the steel is likely not parallel to the tangential centerline of the surrounding coil 5, though it will be nearby. Only numerical analyses can determine the most suitable magnetically preferred orientation of the steel in this case.

Figure 10:
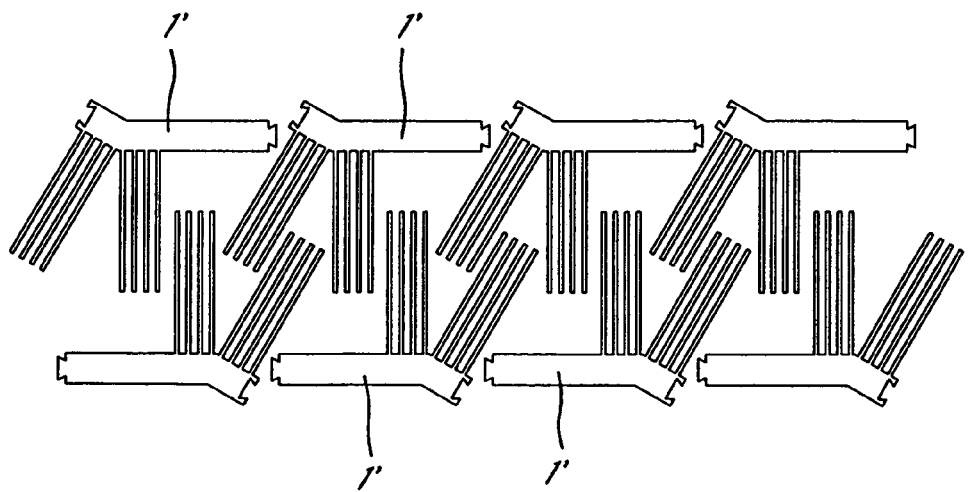
FIG. 10 shows the use of steel with segments provided with extensions at one side.
Figure 11:
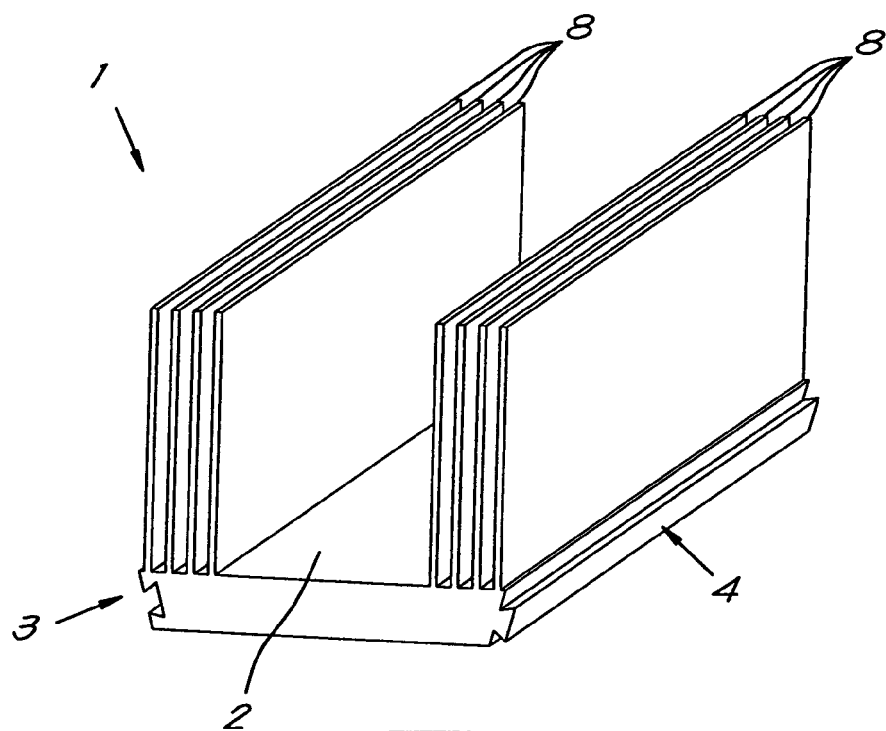
FIG. 11 represents a core segment of a stator core with radially outward extensions at both sides.
Figure 12:
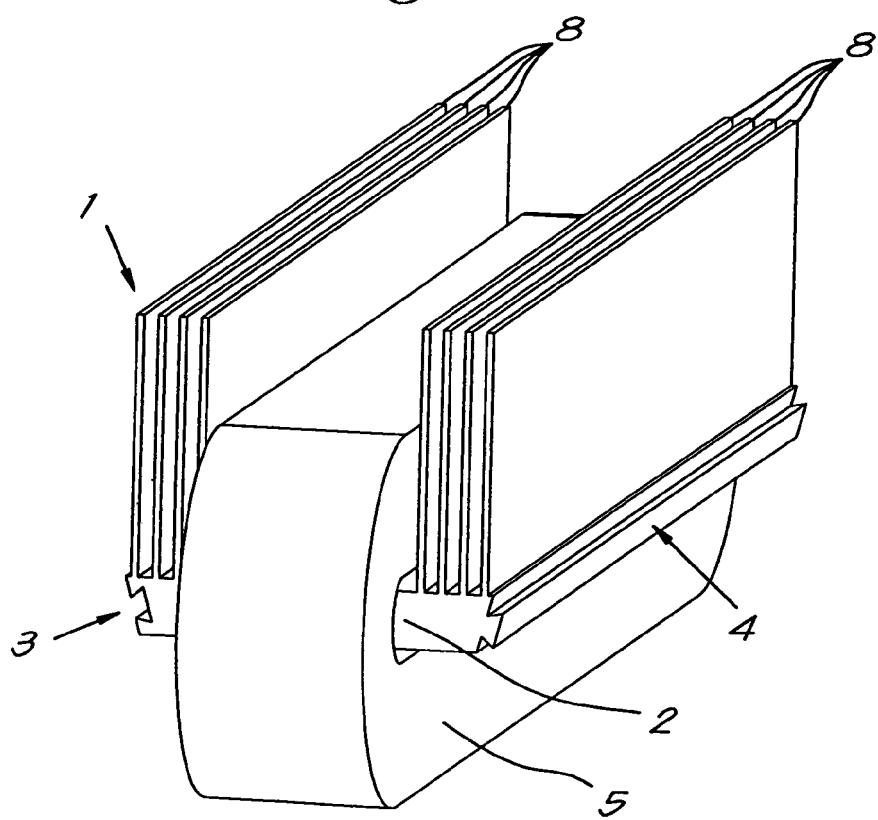
FIG. 12 shows a core segment of a stator core with radially outward extensions at both sides and a coil mounted on it via a direct winding process.
Figure 13:
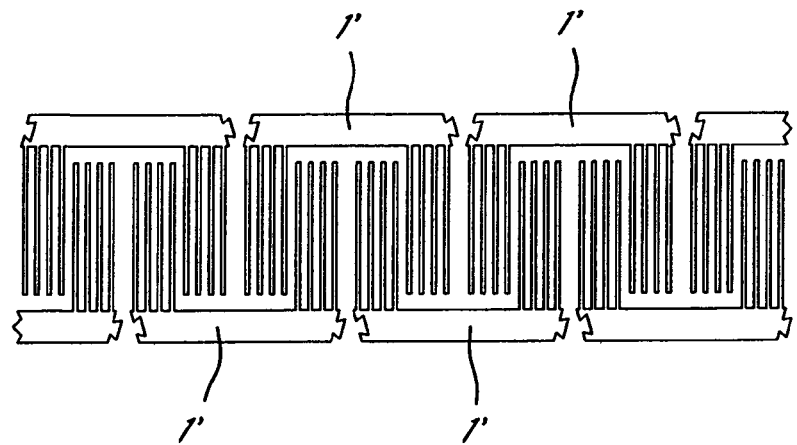
FIG. 13 shows a use of steel with core segments provided with extensions at both sides.

As illustrated in FIG. 10, there may be some waste of material when punching or cutting laminations 1' out of a larger roll of steel for composing core segments 1. Therefore, it is particulary advantageous to use core segments 1 having longitudinal extensions 8 at both longitudinal side edges of each segment base 2, for example as shown in FIG. 11. In this case, the coil 5 is to be wound manually or automatically using a direct winding process. The resulting core segment 1 with coil 5 is shown in FIG. 12. If grain-oriented steel is used, its anisotropic permeability is better exploited. There is less waste of steel when punching or cutting the laminations 1' out of a larger roll of steel, as illustrated in FIG. 13. In any case, the waste of material is small and the cost benefit is obvious, when compared to applications with a toothed stator whose stator laminations are made of a single piece and in which the central part is not used, the latter being the case in many high-speed applications.

In another embodiment of the invention, the extensions 8 can be manufactured apart from the stator segments 1, such that the extensions 8 have to be fixed to the stator segment 1 in an additional assembly step. This allows designers to further reduce waste of material when compared to the example shown in FIG. 13. Moreover, it allows the use of other materials or material combinations for achieving optimal properties regarding cooling and/or leakage inductance.

Figure 21:
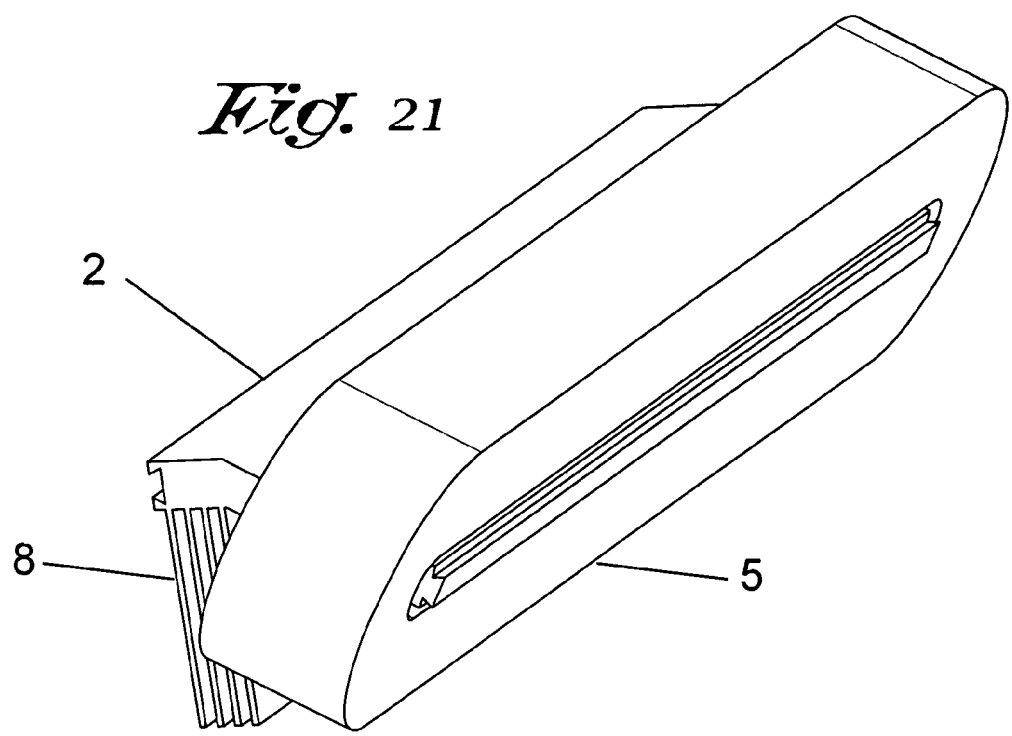
FIG. 21 shows a segment of a stator core with inward directed extensions.
Figure 22:
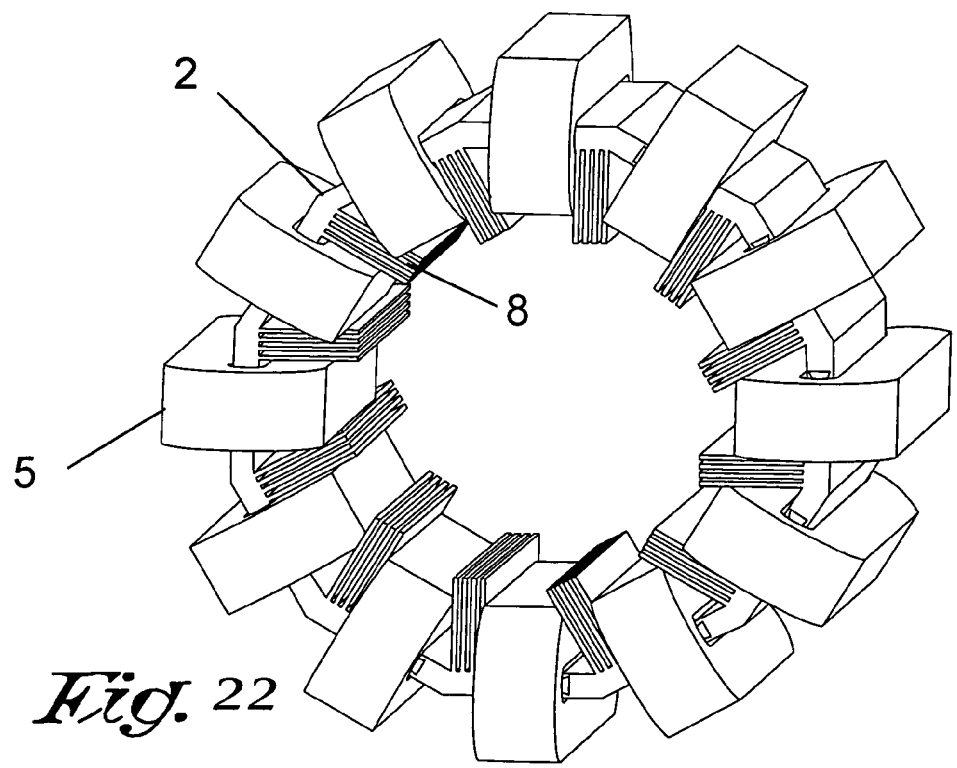
FIG. 22 represents a polygonal core consisting of twelve core segments provided with inward directed extensions.

In another embodiment of the invention, as seen in FIGS. 21-22, inward directed extensions (e.g. fins or teeth) can be provided in a similar way as the outward extensions 8 (e.g. fins), in order to influence both the cooling and the electromagnetic properties of the motor 10. If soft-magnetic inward extensions are used, the motor is not a slotless motor. Obviously, both inward and outward extensions may be combined.

Figure 14:
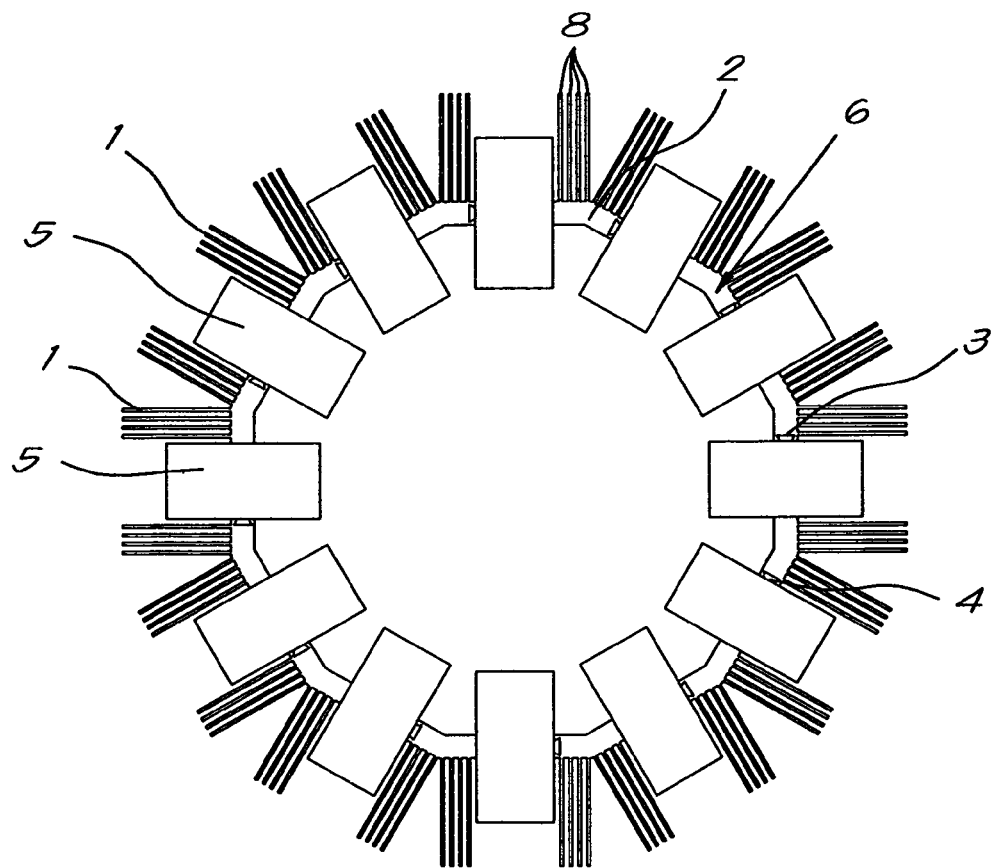
FIG. 14 represents a polygonal core consisting of twelve core segments provided with extensions.
Figure 15:
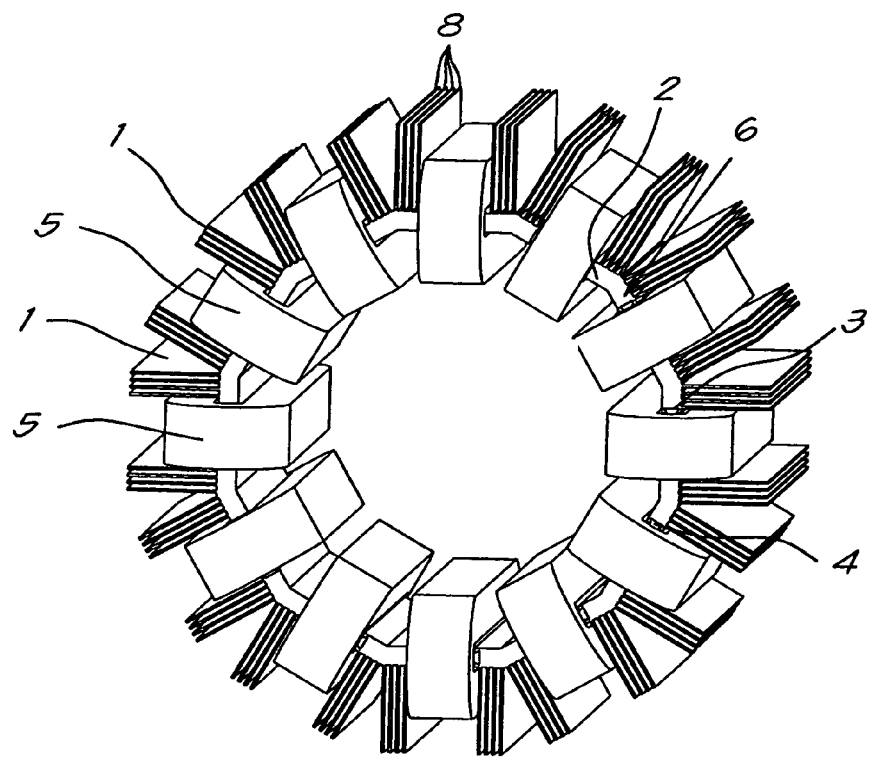
FIG. 15 represents a polygonal core consisting of twelve core segments provided with extensions, 3D plot.

A cross section of the entire stator core 6 and coils 5, when using core segments 1 of the type shown in FIG. 8 or 11, is plotted in FIG. 14. A three-dimensional view is given in FIG. 15. The same stator core 6, but surrounded by a polygonal shell 7, is shown in FIG. 16.

The presence of extensions 8 slightly increases the axial pressure drop for the process gas when compared to the case without extensions. This has some adverse impact on the required power for compression. However, their presence can be advantageously exploited. First, the extensions 8 may serve for mechanically fixing the stator core 6 to the shell 7. The thickness of the extensions 8 must be determined as to avoid bending caused by the torque generation. In a high speed motor, this is not a major problem since the torque levels are relatively low. Second, if the extensions 8 are soft-magnetic they cause some additional magnetic stray field. Consequently, the inductance of the motor is increased, reducing the current ripple and the losses. Third, if the extensions 8 are metallic, they not only increase the cooling surface but also provide a low resistant thermal path from the stator core 6 to the shell 7. In case it would be required by the application, this enables an additional cooling mechanism, by e.g. providing a secondary shell with cooling channels through which is liquid is flowing.

Another option for increasing the cooling capacity is to provide radial space between some or all of the conductor layers. These spaces should ideally be equipped with small gas deviating guides, aiming at some tangential flow of the process gas through these radial openings. Doing so increases the outer diameter of the motor, but the inner dimension is unaffected.

Figure 16:
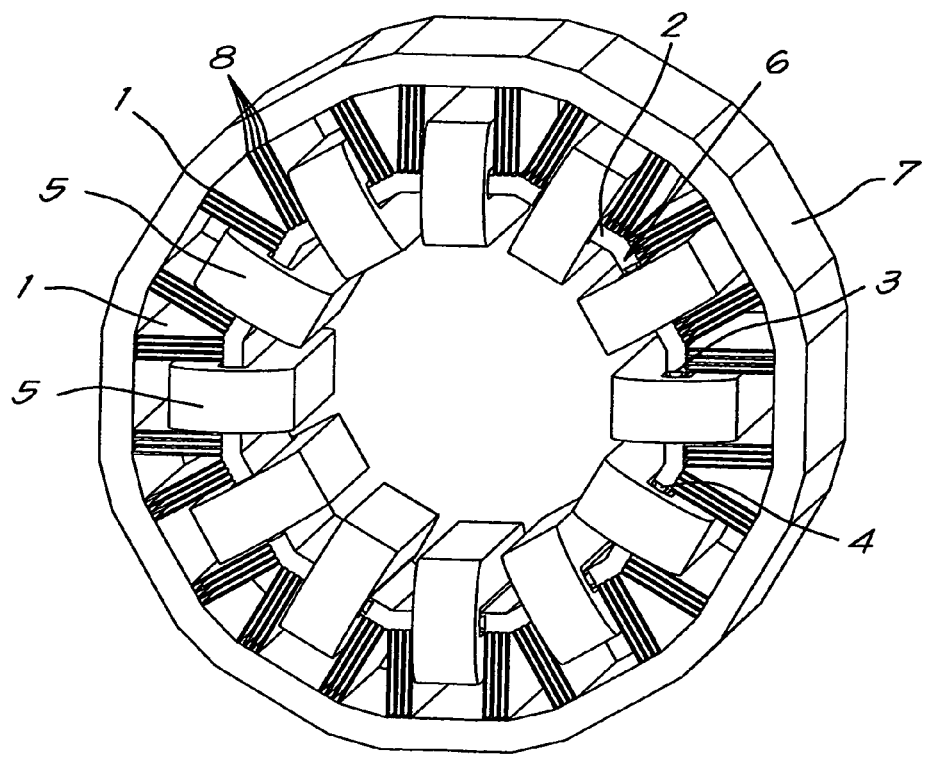
FIG. 16 shows a polygonal stator core consisting of twelve core segments provided with extensions, with surrounding shell.
Figure 23:
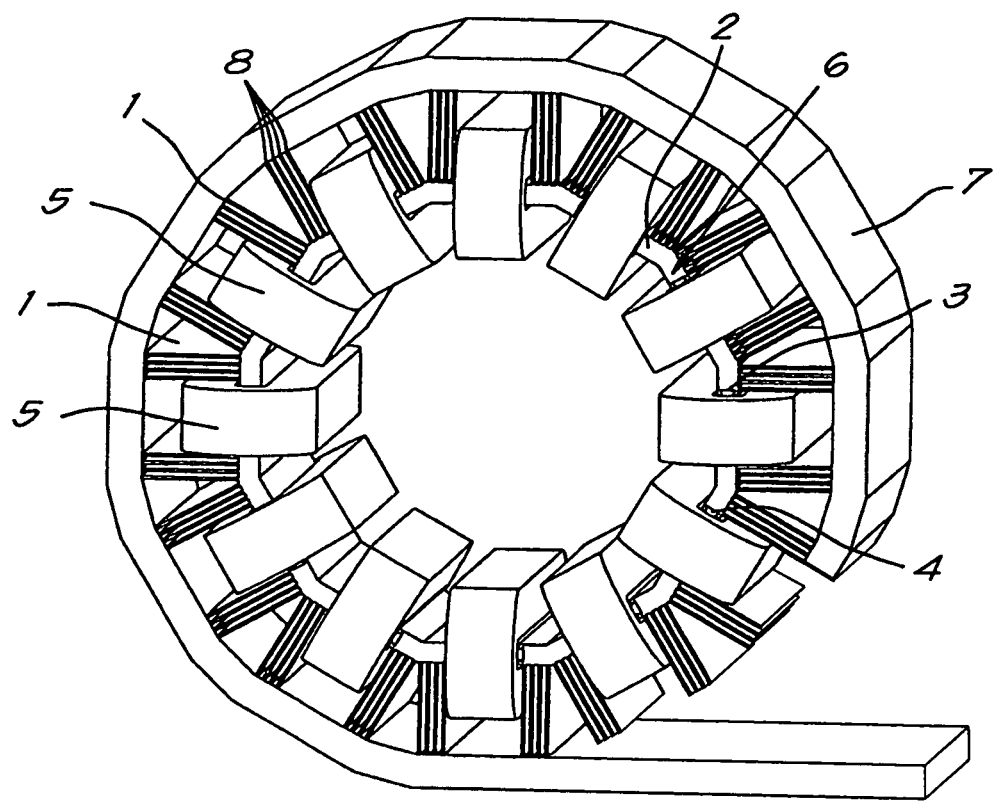
FIG. 23 shows a polygonal stator core consisting of twelve core segments provided with extensions with the surrounding shell wound around the outward extensions.

Referring to FIG. 16, the shell 7 may have the shape of a hollow cylinder. One could e.g. think of press-fitting the entire core assembly inside a hollow cylindrical shell 7. This is a particularly interesting option if a secondary cooling shell is to be provided. However, there are some constructional arguments in favor of a shell 7 with a polygonal shape. First, any relative tangential movement between the stator core 6 and the shell 7, due to torque generation, is inhibited because the distance from the shell 7 to the motor centre is not constant. Second, as seen in FIG. 23, a shell 7 may even be wound with some pre-stress, where the extensions 8 are used as the supporting structure. In that case the designer has the freedom to choose between e.g. soft-magnetic wires and ribbons; other metallic wires, ribbons or sheets; and even non-conductive materials such as carbon or glass fibers.

Figure 17:
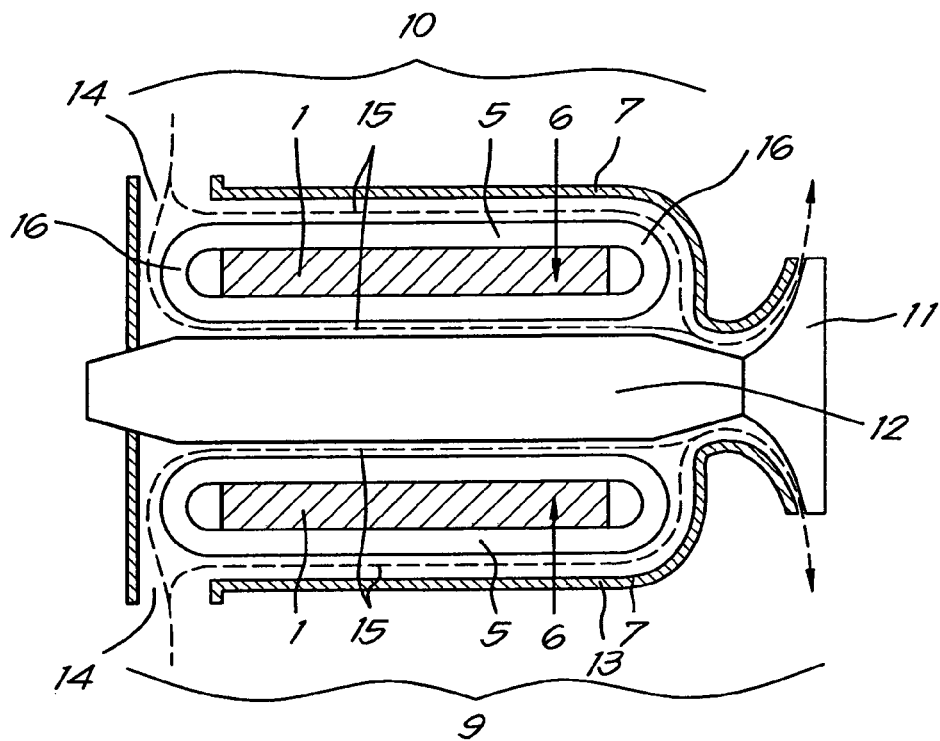
FIG. 17 shows an axial cross section of a single-stage compressor, according to the present invention, with an oppositely mounted impeller.

FIG. 17 represents a longitudinal section of a turbocompressor system 9 according to the invention, said turbocompressor system 9 being provided with a high speed motor 10 with a stator core 6 constructed in accordance with the particulars of the invention, whereby, in this example said turbocompressor system 9 is constructed as a direct driven compressor system as an impeller 11 is mounted directly onto the shaft of a rotor 12 of the motor 10.

The part of the shaft of the rotor 12 under the coils may be electromagnetically designed as to realize a permanent magnet motor or an induction motor.

In the example of FIG. 17, the impeller 11 is mounted oppositely onto the shaft of the rotor 12. The shell 7 integrally forms part of a housing 13 of the motor 10 and said housing 13 shows an inlet 14 for gas, said inlet 14 preferably being positioned near one end of the shaft of the rotor 12, while said impeller 11 is preferably mounted near the other end of said shaft of the rotor 12 and directed with its blades towards the motor 10.

Upon activation of the motor 10, the rotor 12 will start to rotate and the impeller 11 will suck in gas through inlet 14 and motor 10, through the channel 15 confined on the inside by the rotor 12 and the stator core 6 and confined on the outside by said stator core 6 and the shell 7.

The turbocompressor system 9, obtained in this way, is thus characterized in that the principal cooling of the active motor structures and/or of the rotor 12, is achieved by guiding the process gas along the channel 15 over the active motor structures (e.g. coils 5 and stator core 6) of the stator of a high speed motor 10 with toroidally wound coils 5. Both, axial pressure drop and temperature increase, prior to compression, influence the power for compression and should therefore be controlled properly while designing a turbocompressor system 9. The axial pressure drop is mainly determined by the dimensions of the radial cross section. The temperature increase can be influenced by a proper design of the electromagnetic parts and the gap between rotor 12 and stator core 6.

The importance of carefully selecting the material of the core segments 6 has already been pointed out earlier. The preferred embodiment of a high speed motor 10 according to this invention, containing a soft-magnetic core, possibly with soft-magnetic outward extensions 8 (e.g. fins) but not equipped with soft-magnetic inward extensions (e.g. fins), belongs to the class of slotless motors. There are some aspects in which slotless motors have additional advantages. First, in a slotless machine, the magnetic distance between the rotor and the stator core is large when compared to the case of a slotted machine. For this reason, rotor losses due to current and magneto motive force harmonics in the stator do not develop as easily. Second, since the magnetic distance between the rotor 12 and the stator core 6 is large anyhow, a small increase of that distance has no dramatic impact on the electromagnetic field distribution, as it would have in a toothed stator. Therefore, this distance plays a less decisive role during the design process. Consequently, slightly increasing this distance enables drastically reducing the windage loss and limiting the axial pressure drop, without reducing the magnetic flux density too much.

When considering the turbocompressor system on a higher system level, it is remarked that the increased power requirement for the compression, due to the axial pressure drop and the temperature increase prior to compression, can be compensated for by the fact that no fans are needed for having some gas flowing axially, or that no taps are required at the higher pressure side, or that no other cooling medium is required in case a secondary shell is not considered necessary.

Since the stator core 6 of the present invention is toroidally wound, the axial length of the endturns 16 is relatively small, yielding more rotordynamic freedom. This is a very important property in high-speed motor design, since the rotordynamic behavior constitutes one of the major constraints on the performance. In that respect, there is yet another advantage of the particular setup of this invention. Once the process gas has passed the active stator parts, it can directly been ducted into an oppositely mounted impeller 11. By doing so, the bearing functionality is to be provided at the backside of the impeller 11, but the heavy impeller 11 is brought closer to the axial shaft centre, which is beneficial for rotordynamics. In addition, no extra piping is required, thus the total pressure loss in pipes is kept small.

Figure 18:
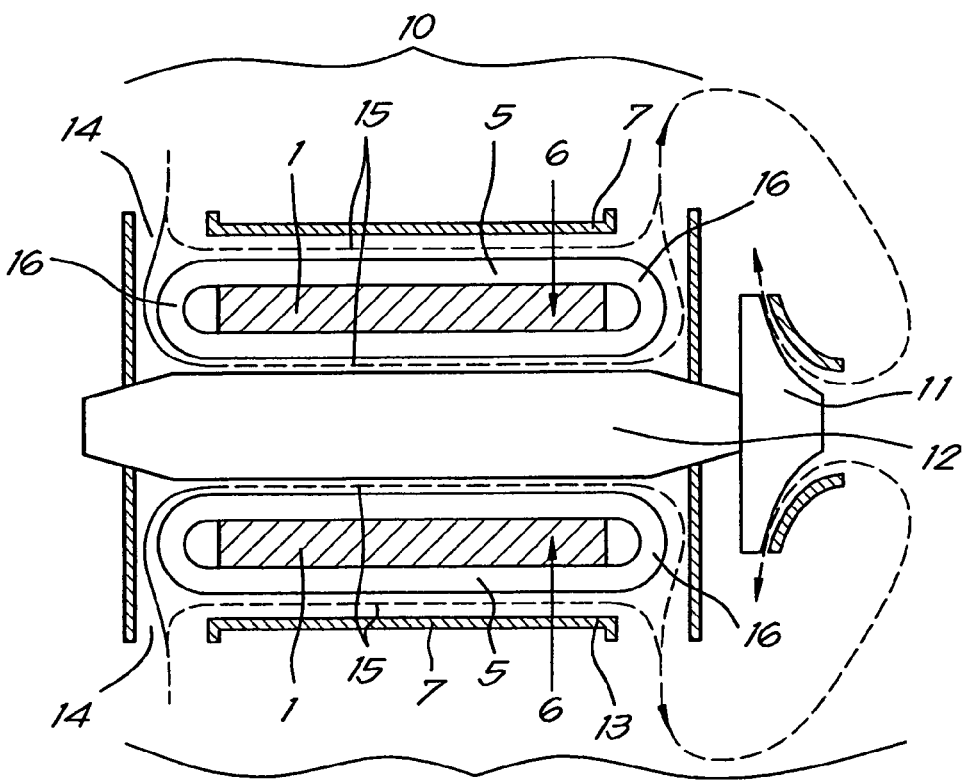
FIG. 18 shows an axial cross section of a single-stage compressor, according to the invention, with a traditionally mounted impeller.
Figure 19:
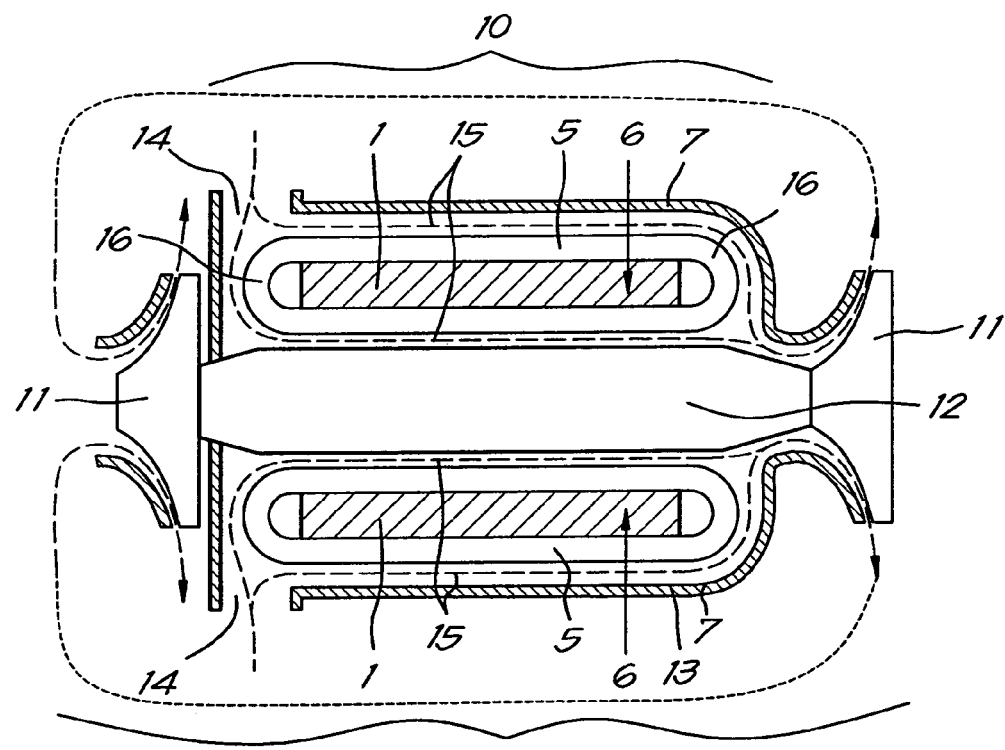
FIG. 19 represents an axial cross section of a two stage compressor, according to the invention, with an oppositely mounted impeller for the low pressure stage and a traditionally mounted impeller for the high pressure stage.
Figure 20:
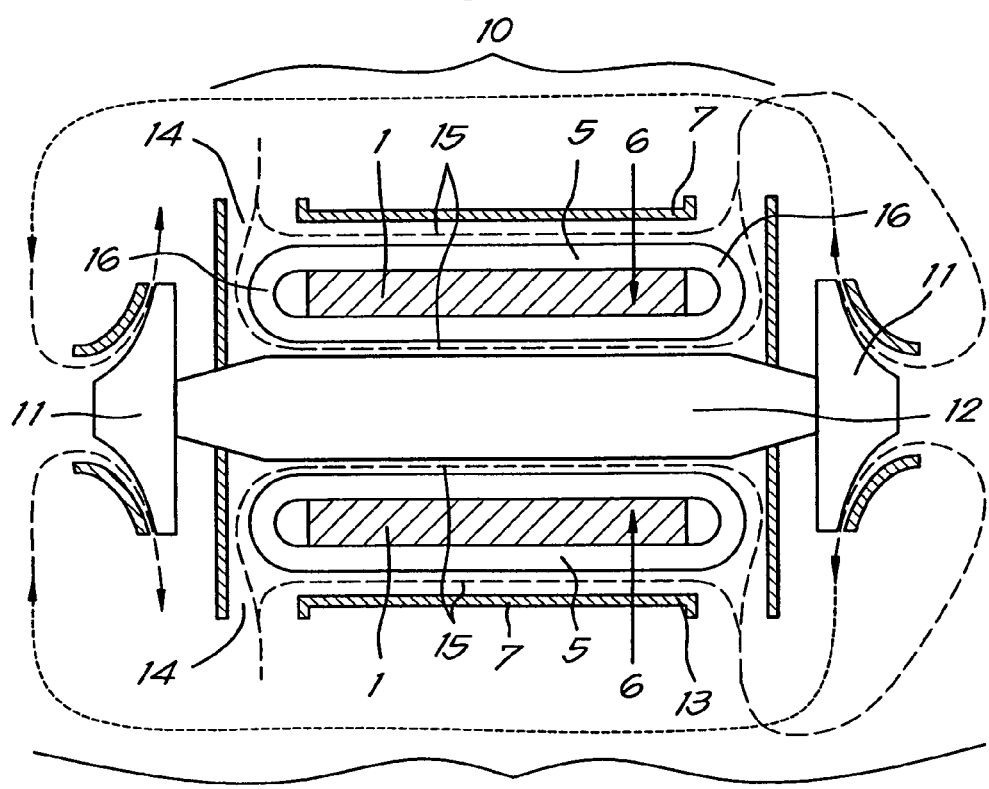
FIG. 20 represents an axial cross section of a two stage compressor, according to the invention, with traditionally mounted impellers for both stages.

The use of the presented motor technology in conjunction with turbocompressors, is not restricted to single-stage compressors. Some other single and two-stage arrangements are shown in FIGS. 18, 19 and 20.

The invention is in no way limited to the forms of embodiments which have been described by way of example or as shown in the figures, since a turbocompressor system according to the invention can be realized in all shapes and sizes.

The invention claimed is:

1. A turbocompressor system comprising:
   a high speed motor having a number of phases larger than one, and comprising a stator and a rotor mounted in a rotative manner relative to said stator, wherein on said rotor one or more impellers are directly fixed;
   said stator comprising active motor structures and a shell;
   said active motor structures comprising a ferromagnetic stator core and a winding, said ferromagnetic stator core comprising a plurality of stator core segments connected along side edges of said stator core segments to form said ferromagnetic stator core, said winding being constructed as a series of toroidal coils which are mounted around a length of each stator core segment extending in the axial direction of the rotor and said coils being physically separated from one another and from the rotor so as to form a first open space;
   each of said stator core segments comprising at least one outwardly directed extension extending from each of said stator core segments;
   said shell being constructed so as to create at least a second open space between said ferromagnetic stator core and said shell;
   said first and second open spaces defining a cooling channel confined on the inside by said rotor and the ferromagnetic stator core and confined on the outside by said ferromagnetic stator core and the shell;
   said cooling channel being configured in a way such that the cooling channel serves as a duct through which process gas is passed axially for directly cooling said active motor structures and the rotor prior to compression by said one or more impellers.

2. The turbocompressor system according to claim 1, wherein said ferromagnetic stator core has a polygonal shape.

3. The turbocompressor system according to claim 1, wherein said ferromagnetic stator core has a cylindrical tubular shape.

4. The turbocompressor system according to claim 1, wherein said ferromagnetic stator core is constructed as stack of single piece ferromagnetic laminations.

5. The turbocompressor system according to claim 1, wherein each core segment is constructed as a stack of soft magnetic non-oriented or grain-oriented steel laminations, amorphous or nanocrystalline ribbons.

6. The turbocompressor system according to claim 1, wherein each core segment is constructed as one of a sintered soft-magnetic powder, soft-magnetic composite or ferrite part.

7. The turbocompressor system according to claim 1, wherein each of the plurality of core segments is constructed as one of the sintered soft-magnetic powder or soft-magnetic composite, and wherein the particle size of the sintered soft-magnetic powder or sintered soft-magnetic composite is smaller than 500 µm.

8. The turbocompressor system according to claim 1, wherein each of the outward extensions are provided along one of the side edges of each of the stator core segments.

9. The turbocompressor system according to claim 8, wherein said outward extensions are integral parts of said ferromagnetic stator core.

10. The turbocompressor system according to claim 8, wherein said outward extensions are formed as separate parts rigidly attached to said ferromagnetic stator core.

11. The turbocompressor system according to claim 8, wherein said toroidal coil is mounted on a free edge of said stator core segment.

12. The turbocompressor system according to claim 1, wherein said outward extensions define a connection between said ferromagnetic stator core and said shell.

13. The turbocompressor system according to claim 12, wherein said shell is constructed as a sleeve wound around said outward extensions.

14. The turbocompressor system according to claim 1, wherein said shell is constructed as a single solid piece.

15. The turbocompressor system according to claim 1, wherein said shell is constructed from a plurality of segments.

16. The turbocompressor system according to claim 1, wherein the number of said coils is an integer of said number of phases.

17. The turbocompressor system according to claim 1, wherein said coils are wound with stranded conductors.

18. The turbocompressor system according to claim 1, wherein said coils are wound with Litz-type conductors.

19. The turbocompressor system according to claim 1, wherein said coils are directly wound over said ferromagnetic stator core.

20. The turbocompressor system according to claim 1, wherein said coils are directly wound over said core segments.

21. The turbocompressor system according to claim 1, wherein said coils are pre-wound on electrically insulating bobbins before being slid over and fixed to said core segments.

22. The turbocompressor system according to claim 1, wherein said winding is a single-layer winding.

23. The turbocompressor system according to claim 1, wherein said winding is a multiple-layer winding.

24. The turbocompressor system according to claim 1, wherein said rotor comprises permanent magnets that enable synchronous operation with the rotating magnetic field generated by currents in said winding in said stator.

25. The turbocompressor system according to claim 1, wherein one impeller is fixed to said rotor in such a manner that process gas flows into said impeller after having passed through said cooling channel.

26. The turbocompressor system according to claim 1, wherein the number of said coils is a fractional multiple of said number of phases.

27. The turbocompressor according to claim 1 wherein each stator core segment has a first leg and a second leg, wherein said first leg comprises the at least one outwardly directed extension extending from the stator core segment, and said second leg comprises the toroidal coil.

28. The turbocompressor according to claim 1, wherein at least one outward extension extends along both side edges of said stator core segments and said toroidal coil is mounted around a middle part of the stator core segment between the side edges.

29. A method for constructing a turbocompressor system, said method comprising the steps of:
providing a stator of an electric motor;
providing a shaft of a rotor of an electric motor, that is rotated by a rotating magnetic field generated in said stator;
mounting one or more impellers on the shaft of said rotor in such a manner that, during operation of the turbocompressor system, process gas is compressed after having passed through the motor for directly cooling active motor structures prior to compression;
assembling said stator comprising active motor structures and a shell, said active motor structures comprising a ferromagnetic stator core and a winding, wherein said assembling comprises connecting a plurality of stator core segments along side edges of said stator core segments to form said ferromagnetic stator core, said winding being constructed as a series of coils which are toroidally formed around a length of each stator core segment extending in the axial direction of the rotor and which are physically separated from each other and the rotor so as to form an open space, wherein each of said stator segments comprise at least one outwardly directed extension extending from each of said stator core segments; and
arranging said shell so as to create additional open space.

30. The method according to claim 29, said method further comprising the steps of:
arranging said shell so as to retain said ferromagnetic stator core via radial forces applied by said shell on said outward extensions.

31. A method for constructing a turbocompressor system, said method comprising the steps of:
providing a stator of an electric motor;
providing a shaft of a rotor of an electric motor, that is rotated by a rotating magnetic field generated in said stator;
mounting one or more impellers on the shaft of said rotor in such a manner that, during operation of the turbocompressor system, process gas is compressed after having passed through the motor for directly cooling active motor structures prior to compression;
assembling said stator comprising active motor structures and a shell, said active motor structures comprising a ferromagnetic stator core and a winding, wherein said assembling comprises connecting a plurality of stator core segments along side edges of said stator core segments to form said ferromagnetic stator core, said winding being constructed as a series of coils which are toroidally formed around a length of each stator core segment extending in the axial direction of the rotor and which are physically separated from each other and the rotor so as to form an open space; and
arranging said shell so as to create additional open space, and
said method further comprising the steps of:
providing said stator with outward extensions;
arranging said shell so as to retain said ferromagnetic stator core via radial forces applied by said shell on said outward extensions, and
further comprising the step winding a flexible material around the outward extension to provide prestress by applying radial force on the outward extensions to automatically retain the ferromagnetic stator core.

32. A turbocompressor system comprising:
a high speed motor having a number of phases larger than one, and comprising a stator and a rotor mounted in a rotative manner relative to said stator, wherein on said rotor one or more impellers are directly fixed;
said stator comprising active motor structures and a shell;
said active motor structures comprising a ferromagnetic stator core and a winding, said ferromagnetic stator core comprising a plurality of stator core segments connected along side edges of said stator core segments to form said ferromagnetic stator core, said winding being constructed as a series of toroidal coils, wherein each toroidal coil is mounted around a length of each stator core segment extending in the axial direction of the rotor and said coils being physically separated from one another and from the rotor so as to form a first open space;

each of said stator core segments comprising at least one inwardly directed extension extending from each of said stator core segments;

said shell being constructed so as to create at least a second open space between said ferromagnetic stator core and said shell;

said first and second open spaces defining a cooling channel confined on the inside by said rotor and the ferromagnetic stator core and confined on the outside by said ferromagnetic stator core and the shell;

said cooling channel being configured in a way such that the cooling channel serves as a duct through which process gas is passed axially for directly cooling said active motor structures and the rotor prior to compression by said one or more impellers.

33. The turbocompressor system according to claim 32, wherein said inward extensions are formed as integral parts of said ferromagnetic stator core.

34. The turbocompressor system according to claim 32, wherein said inward extensions are formed as separate parts rigidly attached to said stator core.

* * * * *